US012688276B2

(12) United States Patent
Yang et al.

(10) Patent No.: US 12,688,276 B2
(45) Date of Patent: Jul. 21, 2026

(54) SHARING CONTAINER DATA INSIDE A TENANT'S POD UNDER DIFFERENT TRUSTED EXECUTION ENVIRONMENTS (TEES)

(71) Applicant: Intel Corporation, Santa Clara, CA (US)

(72) Inventors: Ziye Yang, Shanghai (CN); Malini K. Bhandaru, San Jose, CA (US); Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/889,989

(22) Filed: Aug. 17, 2022

(65) Prior Publication Data

US 2022/0391494 A1 Dec. 8, 2022

(51) Int. Cl.
*G06F 21/53* (2013.01)

(52) U.S. Cl.
CPC ........ *G06F 21/53* (2013.01); *G06F 2221/031* (2013.01)

(58) Field of Classification Search
None
See application file for complete search history.

(56) References Cited

U.S. PATENT DOCUMENTS

| | | | |
|---|---|---|---|
| 8,156,503 B2 | 4/2012 | Ben-Yehuda et al. | |
| 10,230,738 B2 | 3/2019 | Gehrmann et al. | |
| 11,991,273 B2 | 5/2024 | Sheppard et al. | |
| 12,158,979 B2 | 12/2024 | Bursell et al. | |
| 2022/0171883 A1* | 6/2022 | Bursell | G06F 21/71 |
| 2022/0255732 A1* | 8/2022 | Doherty | H04L 9/088 |
| 2023/0036165 A1* | 2/2023 | Bursell | G06F 21/78 |
| 2023/0297406 A1* | 9/2023 | Rogers | G06F 9/45558 |
| 2023/0297666 A1* | 9/2023 | Atamli | G06F 21/53 |
| | | | 726/23 |

* cited by examiner

*Primary Examiner* — Philip J Chea
*Assistant Examiner* — James Ross Hollister
(74) *Attorney, Agent, or Firm* — Compass IP Law PC

(57) ABSTRACT

In a multitenant environment, confidential containers for the tenant having a trusted execution environment (TEE) which have security attested, can share data within the pod or between pods. The ability to share data for confidential containers of the same tenant eliminates the need to have multiple copies for different confidential containers. Thus, a storage device can store shared data specific to a tenant of the multitenant environment, and a caching service backed by protected hardware can manage access to the shared data. Management of the shared data can include attesting a key for a confidential container to verify that the confidential container is part of the TEE for a pod for the tenant, and access the shared data from the storage device for the confidential container based on the attested key.

21 Claims, 11 Drawing Sheets

104

SHARING CONTAINER DATA INSIDE A TENANT'S POD UNDER DIFFERENT TRUSTED EXECUTION ENVIRONMENTS (TEES)

RELATED APPLICATION

This application is based on, and claims the benefit of priority of, Patent Cooperation Treaty (PCT) Application No. PCT/CN2022/103258, filed Jul. 1, 2022. The entire content of that application is incorporated by reference.

FIELD

Descriptions are generally related to network computing, and more particular descriptions are related to sharing data in a server system with confidential containers.

BACKGROUND

Server systems can create confidential containers to allow parallel execution of separate processes on shared hardware resources. Confidential containers refer to virtualization/emulation environments within a trusted execution environment (TEE) to allow the execution of different processes while maintaining confidentiality or protection of proprietary information between the processes. Confidential containers in a trusted execution environment can be referred to as TEEs.

There are various techniques that can be used to provide security for the confidential containers. Regardless of known isolation techniques applied, the isolation of the confidential containers has an unintended consequence that TEEs belonging to a common tenant of a multitenant environment tend to be data isolated in the same way as TEEs of unrelated tenants.

Confidential containers can be grouped to share resources and operate on the same work (process) with the same data. A group of confidential containers can be referred to as a pod. In some systems implementing a pod of containers, each confidential container would need to access and cache a copy of the data, because in those systems sharing data among related confidential containers would compromise the isolation and security of the confidential containers with respect to unrelated nodes. The inability to share data results in wasted hardware resources and increased system bandwidth usage to accommodate access by the different confidential containers.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1A:
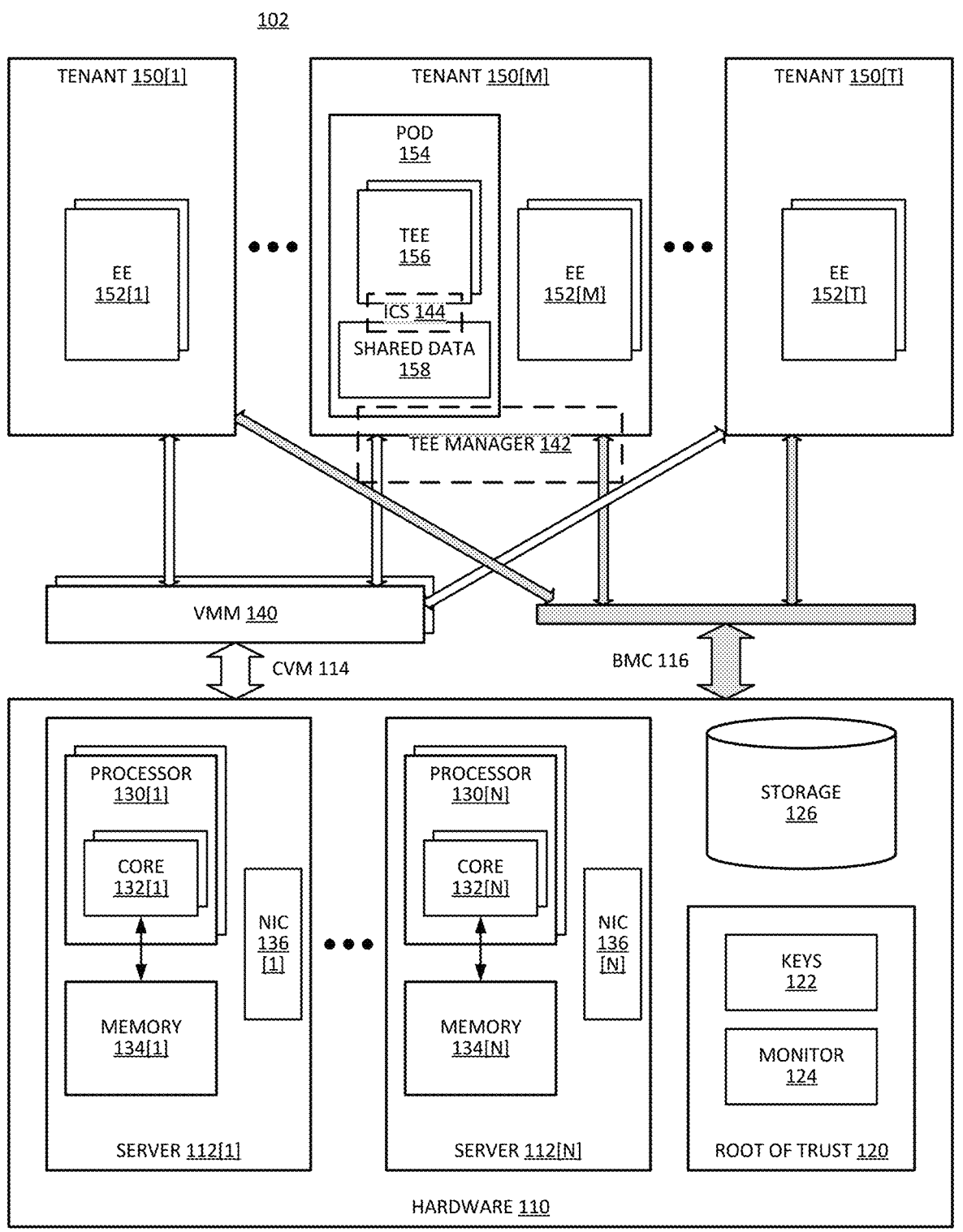
FIG. 1A is a block diagram of an example of a multitenant system in which TEEs of a tenant can securely share data.

Descriptions of certain details and implementations follow, including non-limiting descriptions of the figures, which may depict some or all examples, and well as other potential implementations.

DETAILED DESCRIPTION

In some systems, a caching service provides acceleration of container bootup, but is limited to non-secure-container cases. With such caching, the caching service would cache the plain data after unpacking the data. The cached data would be available to containers from different tenants in the same machine, which exposes the shared data to leakage and probing by the cloud administrators or by other tenants.

With confidential containers, it is very difficult to share data, such as confidential container images in the pods owned by the same tenant. As referred to above, containers can describe hardware system emulation from shared hardware resources, where confidential containers have a trusted executed environment (TEE). Containers having a TEE can be referred to as confidential containers or TEEs. The TEE represents security protections for the container to provide data and process isolation, isolating the execution from other software on the hardware resources.

Confidential containers can have an associated processor for execution and memory resources to store data. The associated processor can be a full processor or can be one or more cores of a processor. The memory resources can be associated with memory ranges of shared resources. Containers can operate in groups, where the containers within the group have at least some shared context. The shared context refers to a runtime configuration, which enables the containers to operate on the same work with the same data. A group of containers can be referred to as a pod. For simplicity herein, groups of confidential containers that share at least some context are referred to as pods throughout the descriptions.

When data cannot be shared among isolated containers, there is duplicated data download from the data registry service. Additionally, there will be duplicated and unnecessary negotiations with the key broker service. For example, in the case of confidential virtual machines (CVMs) that perform work on a common image, the CVMs will each download the same image separately. The duplication of image downloads wastes storage space.

As described herein, TEEs in groups (e.g., pods) of the same tenant, which have security attested, can share data within the group and between groups pods. The ability to share data for confidential containers of the same tenant eliminates the need to have multiple copies for different TEEs. Thus, a storage device can store shared data specific to a tenant of the multitenant environment, and a caching service backed by protected hardware can manage access to the shared data. Management of the shared data can include attesting a key for a TEE to verify that the TEE is part of a group for the tenant and access the shared data from the storage device for the TEE based on the attested key.

As described herein, container data sharing (e.g., image sharing) based on TEE isolated confidential containers can provide data or image sharing in cases of both CVMs and bare metal confidential containers (BMCC). The sharing can be across different types of confidential containers or across confidential containers of the same type. The sharing can occur without breaking the existing protection mechanism of the TEEs.

A system can have a caching service process or multiple caching service processes to manage container content sharing within pods that are controlled by the same tenant. The caching service process(es) an image caching service (ICS) which caches decrypted image data in its process memory. The ICS is referred to specifically throughout, but it will be understood that data other than image data that is shared among confidential containers can be shared as described. The content sharing can apply to any data, code, machine learning models, proprietary processes, or other content. In one example, the ICS stores the image in open container format (OCF) in a secure file system. In one example, the caching service process(es) include a key caching service.

In one example, the caching service process(es) have the same hardware protection as the hardware-backed TEE, which ensures that the caching service can secure the data in a way that other tenants and the cloud administrator cannot access the contents. The caching service enables secure storage and secure sharing of the data, which can eliminate duplicated image downloads from the image registry service. In one example, the system starts many containers with the same data or same image in a pod protected by hardware (HW) TEE.

Some systems implementing confidential container pods have a pod manager in the cloud. The caching services described can provide distributed pod management into the various environments where the confidential containers are implemented, rather than having all pod management in the cloud. The distributed caching service can provide tenant-specific pod management of shared data. The caching service can provide secure sharing of pod resources across multiple TEE elements. The secure sharing can be across a diversity of TEE elements, such as different hardware protection. The secure sharing can function across heterogeneous hardware-backed (HW) TEE elements as well as across homogeneous HW TEE elements.

In one example, the isolation policy applies to currently running containers as well as to stored/archived container images and the workload context within a container. Shared container content can be temporarily stored on a local host platform or can be remotely archived.

FIG. 1A is a block diagram of an example of a multitenant system in which TEEs of a tenant can securely share data. System 102 represents a multitenant system that allows secure sharing among TEEs. System 102 includes hardware 110, which represents the hardware elements to executes the various tenant containers. Hardware 110 includes N servers, server 112[1:N], collectively servers 112.

Servers 112 can execute one or more virtual machine managers (VMMs) 140, to manage the execution of virtual machines or application containers on servers 112. The virtual machines can be in any of the tenants illustrated, and are represented by confidential virtual machine (CVM) 114 executed by hardware 110. A confidential virtual machine is a virtual machine container that executes on a VMM or hypervisor executed by hardware 110.

Servers 112 can execute one or more containers directly on hardware 110 without the use of a VMM or hypervisor. Such a container that does not include the VMM can be referred to as a bare metal container (BMC). Such containers can be in any of the tenants illustrated, and are represented by bare metal containers (BMC) 116. A tenant can have only CVMs 114, only BMCs 116, or a combination of CVMs 114 and BMCs 116.

Servers 112 include one or more processor devices, represented by processors 130[1:N], collectively processors 130. Processors 130 can be or include central processing units (CPUs), graphics processing units (GPUs), programmable arrays (e.g., field programmable gate array (FPGA)), or other processor devices. In one example, processors 130[1:N] can include multicore processors, with multiple cores 132[1:N], respectively, collectively cores 132, or multiple execution units per processor. Cores 132 represent the computational core or processing engine of processor 130.

Servers 112[1:N] include memory 134[1:N], respectively, collectively memory 134, which represents memory resources at the servers to store data for the operations and computations of processors 130. Memory 134 typically includes volatile memory, such as dynamic random access memory (DRAM) devices, which have indeterminate state if power is interrupted. In one example, servers 112 can include nonvolatile memory, which maintains determinate state even when power is interrupted. In one example, servers 112 can include multiple tiers of memory, including volatile and nonvolatile memory.

Servers 112[1:N] can include network interface circuits (NICs) 136[1:n], respectively, collectively NICs 136. NICs 136 include hardware interface components to enable the various servers to communicate with each other and with other components over a network. NICs 136 enable servers 112 to communicate with a server manager, such as a fleet manager, data center controller, or other controller.

In one example, hardware 110 includes root of trust 120, which can communicate with servers 112 over a network. In one example, root of trust 120 is part of one of servers 112. In one example, root of trust 120 is part of a server manager or other data center controller. Root of trust 120 can include keys 122 and monitor 124. Keys 122 represent cryptographic keys for accessing encrypted data. Monitor 124 represents attestation services or other mechanisms that enable root of trust 120 to determine that a device has the proper credentials and security mechanisms to be able to access protected data.

Whether CVMs 114 through VMMs 140, or BMCs 116 directly on hardware 110, system 102 supports execution of various execution environments for tenants 150[1:T], collectively tenants 150. System 102 specifically illustrates tenant 150[1], tenant 150[M], and tenant 150[T] which each include one or more containers, which can be virtual machines or bare metal containers or some combination of both. System 102 represents the containers as execution environments (EEs).

Each of tenants 150 can have multiple execution environments (EEs), such as EE 152[1] for tenant 150[1], EE 152[T] for tenant 150[T]. One or more of EE 152[1] or EE 152[T] can be trusted execution environments (TEEs). Other EEs can be rich execution environments (REEs). Tenant 150[M] is specifically illustrated to have pod 154 with TEEs 156. In one example, tenant 150[M] has other EEs 152[M] which can be REEs or TEEs. While tenant 150[1] and tenant 150[T] include one or more containers, which can include TEEs, the discussion of system 102 will focus on tenant 150[M], which is explicitly shown to include TEEs 156 in pod 154.

Cloud providers, or the entities that own and operate hardware 110, can provide paid access to hardware 110 on which multiple tenants can execute workloads shared across the hardware. With TEE techniques, cloud providers can provide confidential container solutions to protect tenant containers, allowing the tenants to trust the execution environment, where even the cloud administrators cannot access the contents of the TEEs. The contents can include data, intellectual property (IP), such as a trained artificial intelligence (AI) model, executable images, or other content within a container at runtime. The application of TEEs can provide secure storage of tenant data and executable images, having the content bound exclusively to the TEE or protected during transmission to a peer in the network where the TEE is the endpoint of a secure channel.

A tenant can create one or more container pods to run cloud or edge workloads. In general, a pod can refer to a group of containers that execute in parallel on hardware 110 to perform operations for a common workload. One example of a workload executed in a pod is AI training or AI processing, such as image recognition. With a pod of containers, a tenant can trigger the execution of a workload, launching multiple containers (e.g., tens or hundreds or thousands of containers) for execution, and close the containers when done. Such a function as a service (FAAS) allows a tenant to access hardware resources as needed, and then deallocate the containers that use the hardware when a workload completes.

There are different methods for container environment isolation, which can include virtual machines (VMs, such as CVM 114) or bare metal containers (such as BMC 116). One mechanism for isolation includes VM-level isolation. Another mechanism includes process level isolation (PLI).

With VM level isolation, the community or pod of confidential containers (e.g., Kata-CC) leverages VMs that have hardware TEE underpinnings, or hardware environments that protect the execution environments. Examples of hardware underpinnings include, but are not limited to, TRUSTED EXECUTION TECHNOLOGY (TXT) available from INTEL CORPORATION, TRUST DOMAIN EXTENSION (TDX) available from INTEL CORPORATION, SOFTWARE GUARD EXTENSION (SGX) available from INTEL CORPORATION, TRUSTZONE available from ARM LIMITED, SECURE ENCRYPTED VIRTUALIZATION (SEV) available from ADVANCED MICRO DEVICES, INC., or other hardware backing for secure containers.

Hardware-backed TEEs within a VM (i.e., within CVM 114) create a confidential execution environment that can protect against attacks originating from cloud service administrators and other cloud tenants. A Kata-agent in the CVM can directly download the tenant's workload image obtained from a workload image repository. System 102 can include a registration service to facilitate discovery of the repository, which can cause the workload image to only be visible to the TEE with the aid of post provisioning. In one example, other tenant containers or other actors cannot access the image or actors because the CVM TEE environment is isolated from other CVMs operating from within the same pod of containers that are hosted locally.

With process level isolation, the isolated environment can be provided by a software extension that is backed by hardware protection, such as the INTEL SGX. Such an approach to environment isolation can be applied to both bare metal (e.g., BMC 116) or the VM (e.g., CVM 114) cases. With bare metal isolation, a bare metal confidential container (BMCC) can be implemented with technology such as INTEL SGX or INTEL TDX where a libOS container runtime (e.g., Graphene/Gramine) hosts a cloud workload. With process isolation in a VM, technology such as INTEL SGX can be virtualized by a cloud hypervisor or other container manager. With a virtualized SGX, users can still create confidential containers via SGX.

System 102 can have confidential containers created with different techniques, such as CVM or BMCC. System 102 enables sharing among containers in pods that are owned by the same tenant, without the strict isolation policies that would otherwise prevent sharing among containers. Currently using a PLI, the workload image is provisioned to the PLI with confidentiality protection, such as encryption, to ensure sensitive workload data and contents are not accidentally or maliciously shared with unauthorized entities. Using a PLI, an encrypted workload can only be decrypted inside the PLI.

In one example, system 102 provides a tenant specific, per-node caching service associated with each container pod. In one example, the caching service is deployed by a single OS process. In one example, the caching service is deployed as a clustered resource/service for high availability. The caching service is independent of the cloud provider. In one example, the caching service implementation is open source, providing transparency to facilitate verification of its security posture. In one example, the caching service is implemented as a plugin or a new feature in a container framework such as Kubernetes, available from The Linux Foundation.

Some systems with implementations of a multitenant system provide confidential containers and pods for a tenant, with logic to manage the containers, but without focus on logic to manage the pods. As described herein, system 102 can provide distributed pod management. TEE manager 142 and image caching service (ICS) 144 represent distributed management for pod 154.

Pod 154 includes multiple TEEs 156 that use shared data 158. Shared data 158 represents image data or other contents shared by TEEs 156 for the execution of a workload. TEE manager 142 can include logic in VMM 140 and in pod 154 to manage TEEs 156. TEE manager 142 can manage the security of TEEs 156, verifying that the TEEs have the right level of security to access shared data 158. ICS 144 represents logic for pod 154, which can include a service that is part of each TEE 156, to manage access to TEEs 156 by other TEEs and manage access by TEEs 156 to shared data 158.

In general, the distributed logic in system 102 enables the secure sharing of data by TEEs 156 by multiple levels of secure keying. One level of keys can ensure the TEEs are part of pod 154 (e.g., a common public key). Another level of keys (e.g., a unique private key) can ensure that each TEE 156 has the credentials to ensure security, whether on the same hardware (e.g., part of the same virtual machine), or across different hardware (e.g., part of a different virtual machine or part of a BMC). The private keys can enable TEEs 156 to access symmetric keys for use in decrypting and accessing cached data.

ICS 144 can represent the caching service. In one example, ICS 144 or the caching service can perform functions including hardware isolation and attestation, securely obtaining, and caching content, and sharing the content across containers. In one example, securely obtaining and caching the content can include trusted peer access, untrusted peer access, or cloud archive access. For hardware isolation and attestation, the hardware-based TEE is a trusted environment that, among other things, attests its trustworthiness properties. Isolation extends to the cloud administrators who cannot access the image caching service once a container is provided to a tenant.

In one example, system 102 has a layered image caching service, which can be like an operating system PATH variable which provides an ordered list of locations to seek a dependency. In one example, the layered image caching service has a tenant image cache, a cloud cache, and a remote provide or public container image registry service. TEE manager 142 and ICS 144 can represent a layered caching service. In one example, launching the caching service can provide for load balancing of image requests across replicas. In one example, ICS 144 signals tenant users to download images from an image archive or registry and provision decryption keys from a key manager or broker service that operates on behalf of the tenant.

In one example, when starting containers in a VCM or BMCC environment, ICS 144 will negotiate with a local ICS to obtain an image or content for the execution of the containers. In one example, ICS 144 is protected by a HW based TEE (e.g., SGX). In one example, system 102 starts ICS 144 on relevant physical nodes while the tenant pod is created. The physical nodes can refer to physical hardware resources of hardware 110 on which the pod and its associated containers are executed. In one example, system 102 starts ICS 144 in an unpacked manner with additional encrypting mechanisms. In one example, if the container content is not available locally, ICS 144 can obtain and cache the content from a trusted peer, an untrusted peer, or from a cloud archive.

For access to a trust peer, in one example, ICS 144 contacts a trusted peer in pod 154 (i.e., the local pod). In one example, shared data 158 can represent cached contents, which can also be protected by a HW-backed technique. As ICS 144 can represent a service for each TEE 156, a requesting ICS can query a peer ICS if it has the image (e.g., an unencrypted version, with plain data) or if the decrypted image layer is stored in an encrypted file system managed by the peer ICS. If the image is available through the peer ICS, the querying or requesting ICS can directly download the content from the peer or retrieve the content from the encrypted file system with a related unpacked key.

For access to an untrusted peer, in one example, ICS 144 contacts an untrusted peer in pod 154. A peer container in pod 154 may be considered untrusted if it is backed by different hardware. In one example, if the untrusted peer ICS has a ciphertext image (e.g., content encrypted with a local ICS key) or the encrypted image layer is stored in a file system managed by the peer ICS, the requesting ICS can directly download it from the peer or retrieve it from the encrypted file system.

In one example, the content is encrypted with an encryption key common to all the tenant's pod containers. Thus, the content can be cached in ciphertext by an untrusted ICS. Cache semantics will not be disrupted by ciphertext; normally, if the same data is encrypted by different containers, each uses a different key resulting in different ciphertexts even for the same data. In one example, all the tenant's container images for a pod use a common encryption key, enabling the ciphertexts to be cached. When the plain text is encrypted using a key K, and each authorized tenant is issued key K wrapped by its own public key, ensuring that only the authorized user can decrypt the wrapped key. In one example, system 102 can save metadata with the encrypted data with a list of wrapped keys. In such an implementation, revoking a user's access to the content can be as simple as removing the user's wrapped key from the list, indicating that the user is no longer permitted to obtain and decrypt via the service. Thus, system 102 can remove a node (e.g., a container or a group of containers) from access to the service while still maintaining the secret.

For access to a cloud archive, in one example, ICS 144 downloads the image from a cloud archive or registry service (not specifically illustrated in system 102). In one example, ICS 144 leverages a key caching service (e.g., delegating tenant access) to contact a key broker service (KBS) and retrieve the keys which can be used to decrypt the image downloaded from the cloud archive/registry service. ICS 144 can then decrypt the image from the downloaded, encrypted version to a plaintext version. Thus, ICS 144 can store the decrypted image data in the memory of the process, which can be protected by SGX or other HW techniques. In one example, the content can exist in the memory of the process, while the relevant data can also be stored in a local encrypted file system managed by the ICS that accessed the data from the cloud archive/registry service.

In one example, different TEEs 156 have different keys to allow the containers to decrypt contents from other containers of the same tenant (i.e., tenant 150[M]). In one example, ICS 144 can ensure it obtains content only for TEEs 156 or EEs 152[M], which are containers for tenant 150[M]. Containers can be across different hardware components, and in one example, can be hardware protected by different hardware techniques as well as different hardware components. Sharing content for a tenant can reduce container launch time if the containers share content which may or may not be encrypted. In system 102, ICS 144 and TEE manager 142 and ICS 144 enable TEEs 156 to share unpacked images in a secure way while still satisfying the confidential container security requirements, which reduces the launch time of the tenant's containers.

Hardware 110 includes storage resources, represented by storage 126. Storage 126 can include nonvolatile storage that maintains determinate state even if power is interrupted to the device. Storage 126 can include volatile memory that has indeterminate state if power is interrupted to the device. Storage 126 can represent storage of contents such as shared data 158, which is data specific to tenant 150[M] of the multitenant environment of system 102. Storage 126 can represent a data registry or other resource that stores shared data 158 persistently. Storage 126 can represent resources that cache shared data 158 for use by TEEs 156. In one example, storage 126 represents a unified storage controller to manage shared contents for tenants.

Servers 112 represent server devices that can execute execution environments for tenants 150. Servers 112 can execute one or more VMMs to manage TEEs or can execute one or more TEEs directly as bare metal containers. Whatever technology is used to hardware-protect the TEEs, servers 112 execute a pod of TEEs for a tenant. The pod includes a caching service to control access to the shared data for the pod. The caching service can attest a key for one of the TEEs of the pod, to verify that it is part of the tenant's pod. The caching service enables access to the shared data for the TEE, which can include accessing the shared data from storage 126 and can include caching the data for access by the TEE and other TEEs of the pod.

Figure 1B:
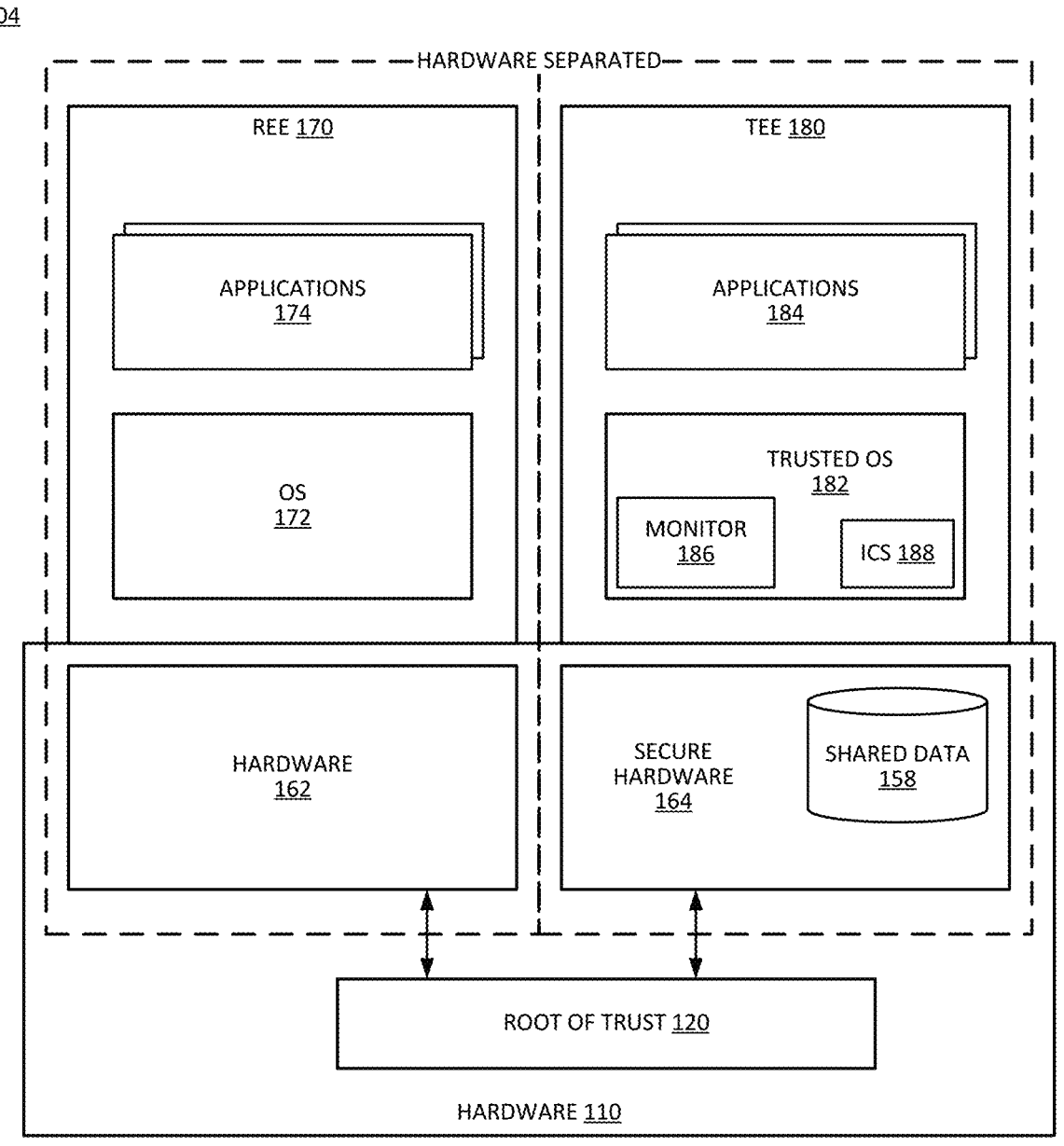
FIG. 1B is a block diagram of an example of a hardware-back TEE that can securely share data with other TEEs of a tenant.

FIG. 1B is a block diagram of an example of a hardware-back TEE that can securely share data with other TEEs of a tenant. System 104 represents a system in accordance with an example of system 102. System 104 represents the hardware separation of trusted execution environments.

In system 104, hardware 110 is shared by rich execution environment (REE) 170 and TEE 180. TEE 180 can be an example of TEEs 156 of system 102. Hardware 110 can be thought of as hardware 162 to execute REE 170 and secure hardware 164 to execute TEE 180.

REE 170 can include operating system (OS) 172 and applications 174. OS 172 and applications 174 execute the operations for the workload of the execution environment. Hardware 162 can be hardware resources that are capable of secure operation, which are executed in a non-secured manner. TEE 180 can include trusted OS 182 and applications 184. Trusted OS 182 and applications 184 execute the operations for the secured workload of the execution environment. In one example, trusted OS 182 includes monitor 186 and ICS 188. Monitor 186 represents processes or logic to manage the security of TEE 180.

Monitor 186 manages the secure use of secure hardware 164. ICS 188 represents a caching service that enables TEE 180 to access shared data 158. In one example, each TEE in a multitenant environment includes an ICS service. As such, ICS 188 can be a full caching service to manage access to data, including attestation of TEE 180 and other TEEs, and manage caching of shared data 158.

In one example, ICS 188 is an access service to a standalone ICS in the pod of which TEE 180 is a part. Thus, ICS 188 can be an interface to a full caching service, which can be separated executed as a protected container, and which the TEEs access for access to shared data 158. Root of trust 120 in hardware 110 represents resources to manage keys and key brokering to verify identity and security of TEEs attempting to access shared data 158. In one example, ICS 188 can cache keys for TEEs.

Figure 2:
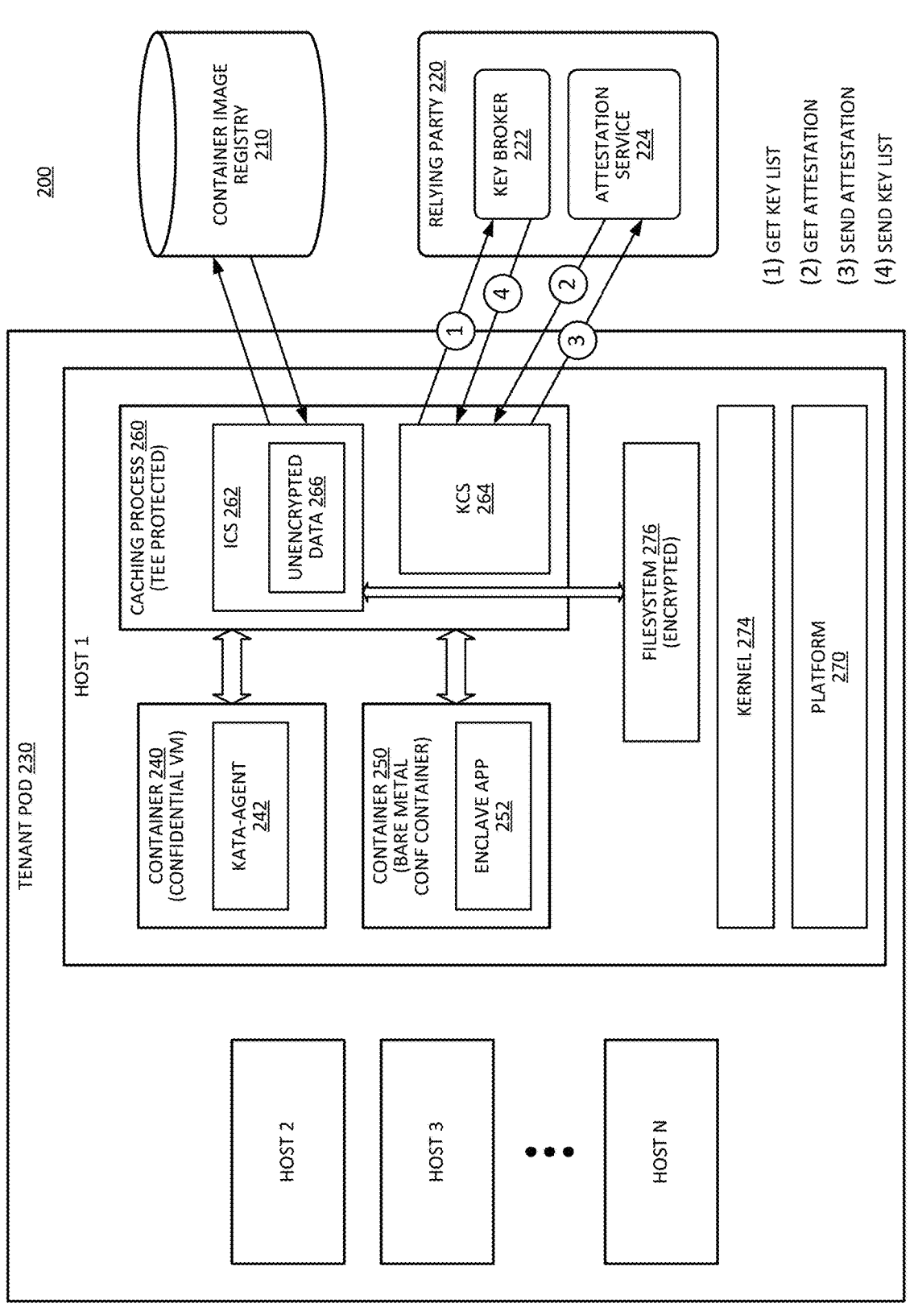
FIG. 2 is a block diagram of an example of data sharing among TEEs of a tenant.

FIG. 2 is a block diagram of an example of data sharing among TEEs of a tenant. System 200 represents a system in accordance with an example of system 102. System 200 illustrates tenant pod 230, which is a pod for a tenant of a multitenant environment.

When there are multiple tenants in a system, there is a need for security and isolation of tenants. The system owner will prefer to minimize the footprint of the tenants even when there is isolation of tenant containers and data. System 200 can enable "buddy sharing" or "family sharing" among containers of the same tenant, which can reduce the resource footprint while maintaining security and isolation. The sharing can refer to sharing within a tenant boundary. The containers within the tenant boundary can be the buddy containers or containers in the same family.

System 200 has tenant pod 230, which includes N hosts, Host[1-N]. Each host represents a group of one or more containers. Host[1:N] can alternatively be referred to as nodes. Tenant pod 230 has multiple containers, which can be organized as hosts, where a host represents a group of containers to share parts of a workload. Tenant pod 230 can include tens or hundreds or thousands of containers, organized as one or many hosts.

In general, the N hosts will each include one or more virtual containers that all work together for a common output, such as an AI model training or other workload that can be processed in parallel by multiple containers. Since all containers in tenant pod 230 have the same tenant, there can be an assumption of security among containers of the same tenant. System 200 can allow sharing of content among such containers, while maintaining stricter content isolation among containers of different tenants.

Host 1 illustrates representative components of all N hosts. In one example, Host 1 includes container 240, which represents a confidential VM (CVM). In one example, Host 1 includes container 250, which represents a bare metal confidential container (BMCC). Container 240 and container 250 are both backed by hardware and can be referred to as TEEs.

Container 240 and container 250 represent different types of hardware-backed TEEs. Container 240 can include Kata-agent 242 as the confidential application or working component of container 240. Container 250 can include enclave application (APP) 252 as the confidential application or working component of container 250.

Host 1 includes caching process 260, which represents a TEE protected caching process. In one example, caching process 260 includes key caching service (KCS) 264 to cache keys for the containers of Host 1. In one example, caching process 260 includes ICS 262, which represents an image caching service for Host 1. In one example, ICS 262 caches or temporarily stores unencrypted data 266. ICS 262 can limit access to unencrypted data 266 to containers having the same VM-level security.

Host 1 can include platform 270, which represents a confidential computing platform for caching process 260. Platform 270 can be or include a TEE service, such as SGX or other technology to provide hardware backing to the services of Host 1. Kernel 274 represents an OS kernel to provide a software environment for caching process 260 to execute. In one example, kernel 274 represents a Linux kernel, where LINUX is a registered trademark of the Linux Mark Institute (LMI) and refers more generally to an OS kernel compatible with GNU/LINUX of the Free Software Foundation (FSF).

Host 1 includes filesystem 276 to manage caching and storage of data by caching process 260. In one example, filesystem 276 represents an encrypted filesystem. With an encrypted filesystem, the storing entity can encrypt data for storage, and the encrypted filesystem will provide an encrypted copy of data to a requesting entity. The requesting entity then uses a key to decrypt the data. Thus, the data can be encrypted at rest in the storage as well as in flight, isolating use of the data to those with the keys needed to decrypt it. In one example, filesystem 276 can be constructed on the tenant's interface to a persistent volume accessible through a container storage interface (CSI).

System 200 can ensure the isolation and protection of shared data among containers of the same tenant. The shared data needs to be initially accessed, and then the system can bootstrap the original secure download for secure sharing. System 200 can thus reduce per-node image management and download overhead for confidential container usage. For purposes of the following description, consider the example of image data as the shared data or shared content. It will be understood that other content can be shared in the way.

The N hosts of tenant pod 230 can represent different nodes in the pod. In one example, each node includes a dedicated caching process such as caching process 260. With the example of the two different TEE solutions illustrated in Host 1 (i.e., a Kata container-based CVM for container 240 and an enclave container BMCC for container 250), each container can be directly compared with container image registry 210 followed by interactions with relying party 220, including with key broker 222 and attestation service 224.

In one example, caching process 260 (which could alternatively be referred to as a dedicated caching process or DCP) in Host 1 can first interact with ICS 262 to warm its cache from container image registry 210. Subsequently, the DCP can use KCS 264 to warm its cache using key broker 222. Once the cache of ICS 262 is warmed with shared data and KCS 264 is warmed with keys, the container can be prepared for bootstrap operations.

The container bootstrap can include: 1) container creation with tenant credentials; 2) hardware TEE backing for the container; 3) image access request by the container through ICS 262; 4) image retrieval by ICS 262; 5) providing image access by ICS 262 to the container; and 6) container boot with access to the shared image data. The following descriptions provide more detail of possible implementations of container bootstrapping.

Regarding container creation with tenant credentials, when a tenant requests to create a pod, system 200 can create a dedicated caching process in each node (e.g., caching process 260 in Host 1 for tenant pod 230). Caching process 260 can have the tenant's credentials and security information. In one example, caching process 260 creates a service port for access requests by other nodes in tenant pod 230. In one example, caching process 260 is protected by a hardware TEE.

Regarding the hardware TEE backing for the container, when the tenant creates a confidential container, the tenant can select a hardware TEE to use to protect the container. In system 200, the tenant can select different HW TEEs for different containers and they will be able to share data. In one example, whatever service the tenant uses to create the confidential container (e.g., "kubelet" or containerd), the service can communicate with caching process 260 to identify the hardware TEE for each container created.

Regarding the image access request by the container through ICS 262, when the confidential container starts up, it will try to obtain one or more images or other contents for its execution. When the container is identified to caching process 260, the container can access caching process 260 to obtain the images. Caching process 260 can direct the request to ICS 262, which can determine whether the image is cached in filesystem 276 (e.g., accessible in the tenant's CSI persistent volume). If the image is not already cached, ICS 262 can retrieve the image. If the image is already cache, ICS 262 does not need to perform the operations related to image retrieval.

If the image is not already cached, ICS 262 can perform image retrieval. In one example, ICS 262 has multiple retrieval choices. One retrieval choice is for ICS 262 to download the encrypted image from container image registry 210. The arrows between ICS 262 and container image registry 210 represent the interchange, where ICS 262 provides a request to the registry, which can then return the encrypted data.

ICS 262 can leverage KCS 264 to negotiate the keys with relying party 220. Relying party 220 can represent a root of trust for system 200. The interaction between KCS 264 and relying party 220 can include KCS 264 sending a GET key list request to key broker 222. In response to the request to key broker 222, the key broker can invoke attestation service 224 to send a GET attestation request to KCS 264. KCS 264 can respond with a SEND attestation to attestation service 224. When the attestation is approved, key broker 222 can SEND key list to KCS 264. With the cached keys, caching process 260 can then attest containers in tenant pod 230 and provide secure shared data based on the keys.

In one example, ICS 262 decrypts the image from container image registry 210 based on a key in KCS 264, then unpacks the image and stores it in filesystem 276. In one example, if the ICS is protected with process level HW-backed TEE, the images stored in filesystem 276 can be encrypted with a new generated key. The newly generated key can be referred to as an "unpacked-image-key". If the ICS is protected with VM level HW-based TEE solution, there is no encryption needed to store the unpacked images because the secure file system is already in a protected environment. Thus, ICS 262 can store the data as unencrypted data 266.

Another retrieval choice is for ICS 262 to download the unpacked image layers with an unpacked-image-key (as needed) from a peer ICS node. A peer ICS node can refer to an ICS of a caching process on Host 2, Host 3, . . . , Host N. Thus, different nodes can manage the caching of shared data, and can then share that data securely with other nodes within tenant pod 230. A peer ICS can verify the requesting ICS as needed, based on credentials associated with the requesting ICS.

Another retrieval choice is for ICS 262 to access filesystem 276 and receive a location of an unpacked image in filesystem 276. Filesystem 276 represents the interface for Host 1 to the shared file storage for tenant pod 230. Other hosts will likewise have access to the storage with filesystem interfaces and can likewise store data in the filesystem. In one example, ICS 262 can access data stored by another host node through filesystem 276.

Regarding providing image access by ICS 262 to the container, either after retrieval (as described in (4)) or if the image was previously retrieved (and thus (4) was skipped as to the requested image data), ICS 262 can provide access to the container to the shared image. In one example, ICS 262 provides the requesting container information needed to access the unpacked image through the filesystem 276. In one example, ICS 262 provides the container boot process with the relevant unpacked-image-key and a filesystem path or a mechanism to locate and access the data from filesystem 276. In one example, the providing of the unpacked-image-key to the container is protected with an asymmetric key algorithm in transmission, such as the Rivest, Shamir, & Adleman (RSA) algorithm. In one example, ICS 262 provides a path in filesystem 276. In one example, ICS 262 provides access to a service that the container can use to access the data.

Regarding container boot with access to the shared image data, in one example, the container boot process can access the image data differently depending on the type of hardware TEE backing for the container. In one example, when the container boot process starts up the container with a process level HW-backed TEE, the boot process uses the access provided by ICS 262 to directly access filesystem 276 and leverage the unpacked-image-key to decrypt the contents in the encrypted filesystem. In one example, when the container boot process starts up the container with a VM level HW-backed TEE, the boot process can simply use the contents without need for a key to decrypt the data, since the container and ICS 262 are in the same VM. When the container and the ICS are in the same VM, the encryption mechanism is not needed, and the container can access unencrypted data 266.

For the container bootstrapping, the tenant in system 200 can start up multiple containers with the container images and reduce the communication overhead needed to start many containers to compose microservices on the same container images. Such bootstrapping is useful for a function-as-a-service where the system enables launching event-driven containers with relatively low container launch latency.

In one example, the confidential containers owned by the tenant have an overlay structure, where the underlying image layers of different containers have the same contents. If one confidential container boots up, ICS 262 caches the contents of the layer (e.g., decrypted image layer data). Subsequent confidential containers, or containers started after the first is booted and the image layer cached, can share the image layers during startup of the tenant's pod of shared containers. Thus, tenant pod 230 can directly realize the benefits from ICS 262.

In one example, container sharing post bootstrap for another container can start by the new container communicating with the local ICS. The local ICS refers to the instance of ICS 262 in the host to which the new container belongs. In one example, the local ICS or instance of ICS 262 in one host can communicate to instances of the ICS in other nodes to share data. If the same image (i.e., an image identified with the same unique identifier (ID)) is already cached (i.e., the image layer is decrypted, unpacked, and stored in a secure filesystem) by the ICS instance in the other host, the new container can bootstrap by accessing the peer node instead of needing to access the data from container image registry 210. The ability to share the copy of the image among multiple containers instead of accessing container image registry 210 for each container instance to access multiple copies of the same image can save significant boot time, storage space, and network bandwidth. Considering an example with 100 containers needing the same image layer for startup on the same node, the image can be cached once, and the need to access and store the image can be avoided 99 times.

In one example, a cached image has a lifetime associated with it. The lifetime refers to a period for which the image can be accessed; after expiration of the lifetime of the cached image, the cache evicts the data, and the system will require a subsequent request for the data including attestation and use of keys. Thus, the data cannot be cached indefinitely, and the data must be accessed periodically with valid security procedures. In one example, the lifetime is configurable. With a function-as-a-service (FaaS) approach, the number of pods might reduce to zero if there is no new incoming request, and normally the data would be lost. With a lifetime associated with the data, the data can be cached for longer than a period of time in which there are containers actively working on the data, which will reduce launch latency to bring back up more containers to perform more work on the same shared data.

In one example, each of Host[1:N] includes an instance of caching service 260, which can be referred to as different DCP nodes. In one example, system 200 can have a primary DCP and subordinate DCPs in a tenant pod. For example, caching service 260 could be a primary DCP, and caching service instances in Host[2:N] can be subordinate DCPs. The DCP can be thought of as a pod manager, and can be distributed as described. In general, caching service 260 or the DCPs ensure that all containers in tenant pod 230 have sufficient security or secure policies to participate in the pod without compromising the security of the pod.

Figure 3:
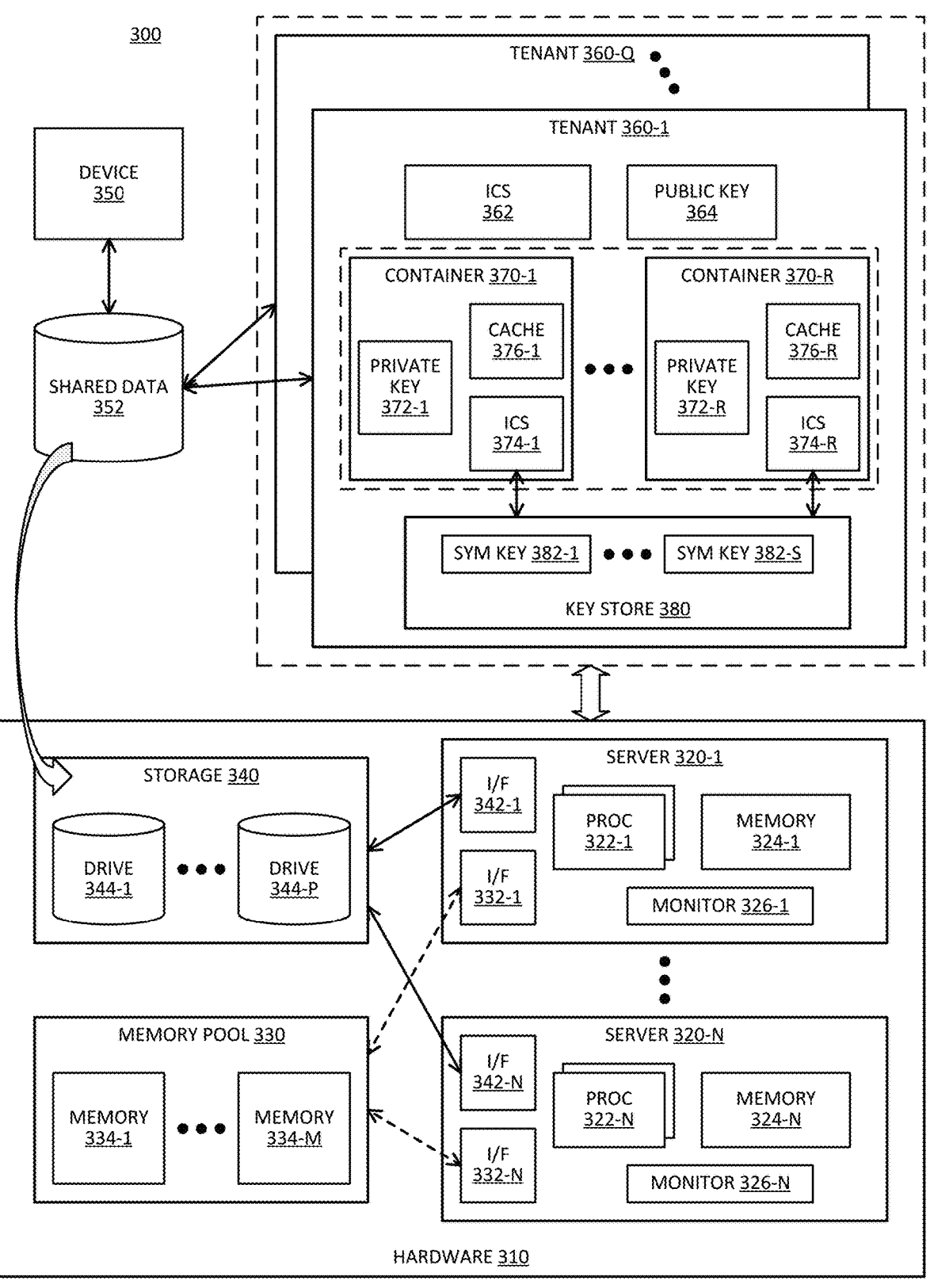
FIG. 3 is a block diagram of an example of a system with multiple levels of keying to secure data sharing among TEEs.

FIG. 3 is a block diagram of an example of a system with multiple levels of keying to secure data sharing among TEEs. System 300 represents a system in accordance with an example of system 102 or an example of system 200. System 300 more specifically illustrates the use of multiple levels of cryptographic keys for secure sharing in a multitenant environment.

In one example, system 300 applies three levels of keying. The three levels can include: 1) a common public key; 2) private keys per container; and, 3) symmetric keys. The common public key can be a group signing key or a common public key shared by all containers provisioned within a group key. The group key can be associated with a tenant. In such a case all containers for the tenant can be provisioned within the group key. The group key can be associated with a node for more isolation between containers. The group key enables secure caching of shared data under the same public key.

In one example, each container has a unique private key. The different private key enables the container to attest its identity separately from other containers. In one example, the containers use their private keys to acquire symmetric keys used to access shared data. The use of the private keys to access the symmetric keys can be referred to as wrapping the symmetric key in the private keys by encrypting the symmetric key exchange using the private key.

Use of a symmetric key for data decryption is generally faster but considered less secure than use of asymmetric encryption, such as the use of public-private key pairs. With system 300, the system can apply public-private key pairs to secure the original attestation, and then use symmetric keys to improve the speed of access to encrypted data. In one example, the symmetric key refers to a key for access to the encrypted contents of the filesystem. Wrapping the symmetric key of encrypted filesystem with asymmetric key of the container allows the containers to share a common directory that will still be isolated because of the wrapped keys.

System 300 illustrates hardware 310 as including N servers, server 320-1 to server 320-N, where N is an integer, collectively referred to as servers 320. Each server 320 can have multiple processors (PROC), memory, and interfaces (I/F). More specifically, server 320-1 includes processors 322-1, memory 324-1, interface 342-1 to interface to storage 340, and interface 332-1 to interface with memory pool 330. Server 320-N includes processors 322-N, memory 324-N, interface 342-N to interface to storage 340, and interface 332-N to interface with memory pool 330.

In one example, server 320-1 includes monitor 326-1 and server 320-N includes monitor 326-N, where monitor 326-1 through monitor 326-N are collectively referred to as monitors 326. Monitors 326 represent hardware separation that enables running different types of confidential containers on the hardware.

Storage 340 represents persistent storage for system 300, which can include drive 344-1, . . . , drive 344-P, collectively drives 344. Drives 344 can be any type of persistent storage. Storage 340 can be managed by an encrypted filesystem to separately manage data for different tenants. Memory pool 330 represents system memory devices for operational data and code for servers 320. Memory pool 330 typically includes volatile memory, whereas storage 340 will typically include nonvolatile or persistent memory. Memory pool 330 can include memory 334-1, . . . , memory 334-M, collectively memory devices 334. Memory devices 334 can be memory modules or memory rack devices to be shared by servers 320.

In one example, shared data 352, which represents the data shared by the confidential containers of a tenant, is stored in storage 340 via an encrypted filesystem. In one example, the data can be temporarily stored or cached in memory pool 330. Thus, the arrow to storage 340 can represent storage in a repository, where operational data is typically stored in memory devices 334.

System 300 illustrates tenant 360-1, . . . , tenant 360-Q, collectively tenants 360. Tenants 360 are the multiple tenants of the multitenant environment provided by hardware 310. Each tenant 360 can provision hardware-backed containers for execution. System 300 illustrates details of tenant 360-1, which can be understood as an example that can apply to others of tenants 360.

Tenant 360-1 provisions multiple hardware backed confidential containers or TEEs, represented by container 370-1, . . . , container 370-R, collectively containers 370. Tenant 360-1 can include ICS 362, which represents pod management to enable caching and sharing shared data 352 within the tenant for containers 370. In one example, ICS 362 represents a primary caching service or DCP for tenant 360-1, with each container 370 having a tie-in service.

In one example, container 370-1 includes private key 372-1, which is unique to container 370-1. Private key 372-R is a unique private key for container 370-R. In one example, public key 364 is common to all containers 370 created within tenant 360-1. Thus, containers 370 can share public key 364 and have unique private keys 372.

In one example, to the extent each container 370 includes ICS 374 (i.e., ICS 374-1, . . . , ICS 374-R in container 370-1, . . . , container 370-R, respectively), the local ICS for each container can manage caching of data. Cache 376-1, . . . , cache 376-R, collectively caches 376, represent the ability of each ICS 374 to manage caching of shared data 352. The cache is not necessarily "part" of the container, but is executed on secure hardware associated with the container or with the ICS that requests and caches it.

In one example, containers 370 share an encrypted filesystem, which has a symmetric key associated with each content item stored in it. Key store 380 represents a key caching service for tenant 360-1 to store symmetric (SYM) keys 382 (symmetric key 382-1, . . . , symmetric key 382-S) for the encrypted filesystem. In one example, key store 380 also caches private key information (not specifically illustrated) to be able to confirm the identity of containers 370 for access to symmetric keys 382.

With the multiple layers of keying in system 300, containers 370 can sign data with public key 364 and decrypt data with private keys 372. In one example, to access shared data among containers, a container or TEE provides its unique private key 372 to the caching service (e.g., ICS 374 or ICS 362, or both), and receives one of symmetric keys 382 to decrypt shared data.

Device 350 represents a sensor or other device that generates data in its operation. In one example, device 350 is shareable across different tenants 360. Consider an example of an image recognition task, where a camera frame capture can launch an identification task involving a machine learning model whose confidentiality and integrity are top priorities. In one example, device 350 can generate data as shared data 352 that will be used by multiple tenants.

It will be understood that even if "shared data 352" is accessed by multiple tenants (e.g., through a common application programming interface (API)), the data sharing described throughout is in reference to sharing data across containers within a tenant. Thus, shared data 352 could include data that is accessed and cached within tenant 360-1, which can then be shared across containers 370 within tenant 360-1. Shared data 352 could include data (even some of the same images) that is accessed and cached within tenant 360-Q, which can then be shared across containers within tenant 360-Q.

Even if the source of the data is the same, the different levels of keying ensures that data is not shareable across containers of different tenants. Thus, containers 370 can share data within tenant 360-1, which will not be accessible to containers of tenant 360-Q. Rather, the caching service can limit access to the data by containers with the right credentials within the same tenant pod.

It will be understood that M, N, P, Q, R, and S represent integer variables. There is not necessarily any requirement of any association between any of the variables. The variables can all be unique. One or more of the variables can represent the same number. The numbers for each component can vary by system implementation.

Figure 4:
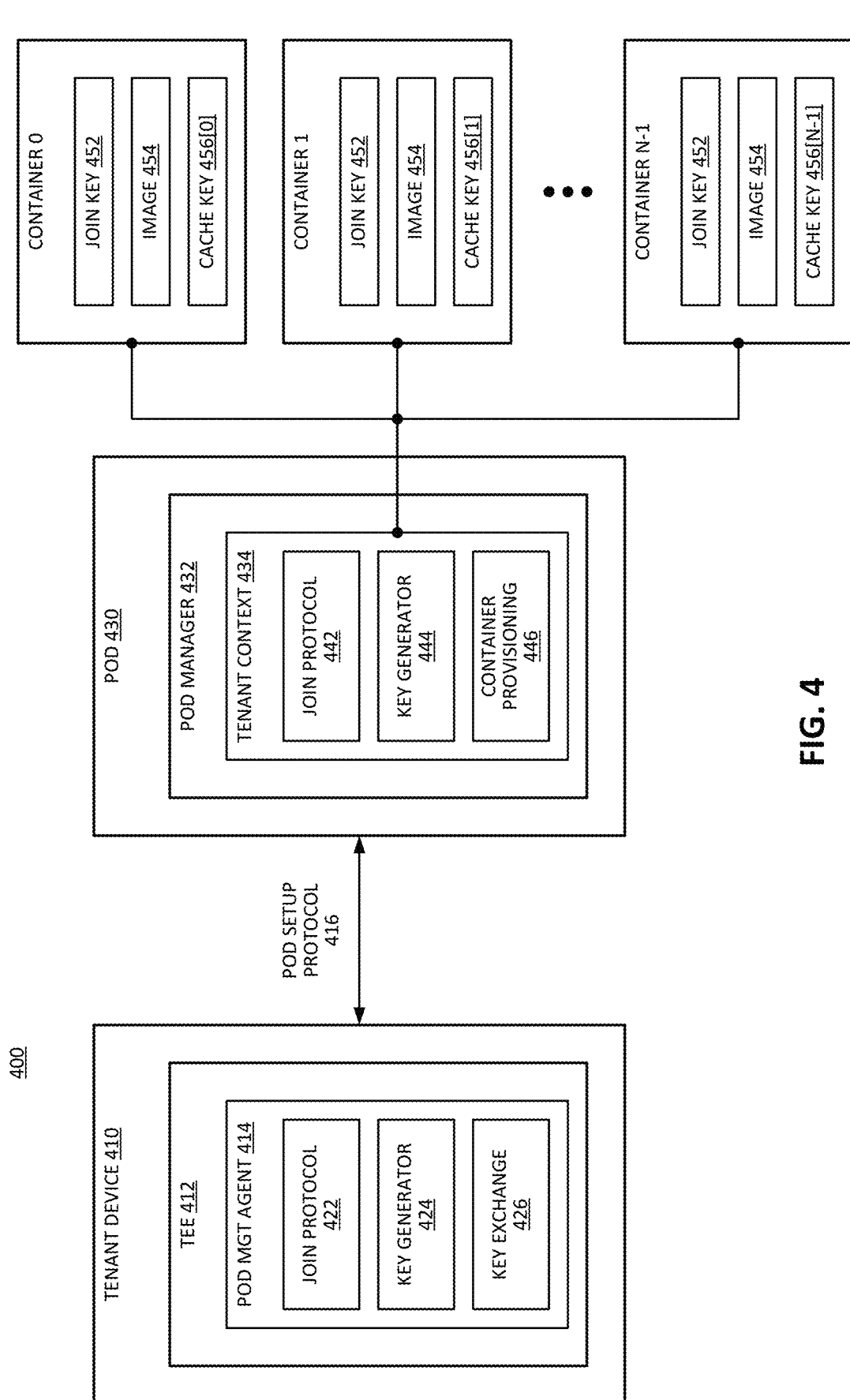
FIG. 4 is a block diagram of a pod setup for secure caching.

FIG. 4 is a block diagram of a pod setup for secure caching. System 400 represents a system in accordance with an example of system 102 or an example of system 200 or an example of system 300. System 400 more specifically illustrates the use of multiple levels of cryptographic keys in a key exchange.

System 400 includes N containers, Container[0:(N-1)], which are part of pod 430. Pod 430 is executed on tenant device 410, which can be a collection of hardware resources provisioned for the execution of multiple TEEs by the tenant.

TEE 412 represents a secure hardware separation of shared hardware resources, where TEE 412 provides secure hardware for the tenant. In one example, TEE 412 includes pod management (MGT) agent 414, which represents a management unit for the pod. Pod management agent 414 can provision hardware resources for the confidential containers.

Pod 430 is managed by pod management agent 414. Pod manager 432 can provision confidential containers and trigger access by the containers to shared data. Tenant context 434 represents shared context for the pod, which can provide common properties or common credentials shared by containers within pod 430.

In one example, system 400 enables use of a group signing key with a symmetric key exchange. The tenant associated with tenant device 410 can facilitate pod container creation and initialization to include provisioning of a container image encryption key and group signing key that is used for secure caching of container images.

Use of a group signing key can allow the system to recover the cache when using a persistent volume. Recovering the cache can refer to using the filesystem and still being able to recover and reuse it should the TEE environment collapse. Such recovery can occur as long as a replica holds the shared group and private keys. The tenant caches can all load the same persistent volume which can also be backed by persistent memory, such as persistent memory (PMEM) available from INTEL CORPORATION. In one example, the tenant uses a group signing algorithm such as enhanced privacy identifier (EPID) available from INTEL CORPORATION to provision pod containers with a group private key and to onboard each container into the tenant's context.

In one example, the tenant implements a group join protocol 422 within TEE 412, where join protocol 422 interacts with pod manager 432 that is responsible for creation, initialization, and provisioning of the N containers under tenant context 434. Pod management agent 414 can trigger pod manager 432 to create the containers via pod setup protocol 416. In one example, pod manager 432 utilizes an isolation technique to create the opposing side of pod setup protocol 416, where pod manager 432 implements the client side of the join protocol, represented by join protocol 442 of tenant context 434, on behalf of each container to be created and provisioned. Container provisioning 446 in tenant context 434 represents the provisioning of the N containers by pod manager 432.

Implementation of the join protocol between join protocol 422 and join protocol 442 results in a different private key for each container and a common public key. Thus, pod management agent 414 can utilize key generator 424 to specify the group name for the group public key which may serve as a namespace pretext for the container namespaces. Then, key generator 444 can provision private keys to each container context. The key generation could involve using a root of trust technology to store and protect the private key(s).

In the containers, join key 452 represents the common public key in each of the N containers. Cache key 456[0: (N-1)] can represent the private keys, which are different for each container. Image 454 represents the access of each container to the shared data.

The private keys can be used with a Sigma or signed Diffie-Hellman protocol to exchange symmetric keys, as represented by key exchange 426, which are known only to the tenant's containers. At least one shared symmetric key can be negotiated that is used to encrypt the container images. Container images can consist of data, artificial intelligence/deep learning (AI/DL) models, workload functions (e.g., interpreted script, compiled code for a runtime, or other function), or other data.

The tenant node that imports the image into the tenant's TEE can decrypt the image using the symmetric cache key as part of the image load/onboarding operation. After container initialization and key provisioning, pod containers can be provided to the ICS or caching service for caching. The various caching modes (such as those described above) can be supported depending on where the container images are stored, the ICS caching policy, and whether the caching policy calls for cipher-text images in the cache.

Figure 5:
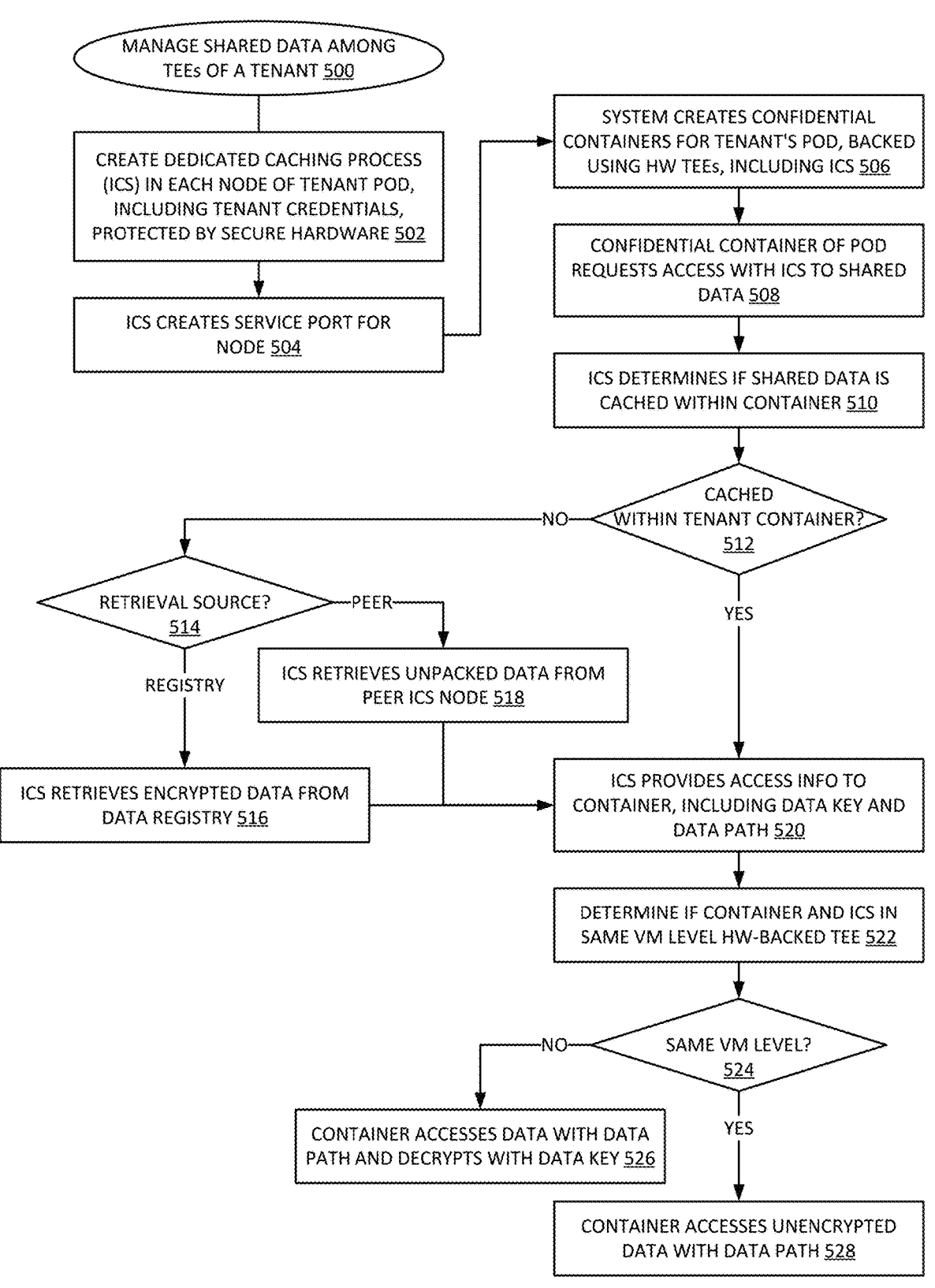
FIG. 5 is a flow diagram of an example of a process for managing shared data among TEEs of a tenant.

FIG. 5 is a flow diagram of an example of a process for managing shared data among TEEs of a tenant. Process 500 represents a process for managing shared data among TEEs of a tenant, which can be implemented in an example of system 102, an example of system 200, an example of system 300, or an example of system 400.

In one example, the system creates a dedicated caching process including an ICS in each node of the tenant pod, including tenant credentials, protected by secure hardware, at 502. The ICS can then create a service port for the node, at 504. When the system creates confidential containers for the tenant's pod, it can create containers backed using hardware TEEs, and including an ICS service or ICS service interface in the container, at 506. A confidential container of the pod can request access with its local ICS to shared data, at 508. The request for access to the data can be at startup of the container.

In one example, the ICS determine if the shared data is cached within a container of the pod, which can be through an encrypted filesystem accessible by the containers, at 510. If the data is not cached within a tenant container, at 512 NO branch, the ICS can retrieve the data. In one example, the ICS can retrieve the data from one of two different sources.

When the retrieval source is a registry, at 514 REGISTRY branch, the ICS can retrieve the encrypted data from a data registry, at 516. In one example, the ICS leverages the key caching service to negotiate the keys with the key broker service. The ICS can then decrypt the image with the key, unpack the images, and store them in the secure file system.

When the retrieval source is a peer, at 514 PEER branch, the ICS can retrieve the unpacked data from a peer ICS node, at 518. In one example, the ICS downloads the unpacked image layers with the unpacked-image-key (if needed) from the peer ICS node or get the location of the unpacked image in the secure file system.

In one example, if the data is cached within the tenant container, at 512, or after the data has been retrieved from the data registry or from a peer ICS node, the ICS can provide access information to the container, including data key and data path, at 520.

In one example, the system determines if the container and ICS is in the same VM level hardware-backed TEE, at 522. If the same VM level does not apply, at 524 NO branch, the ICS is protected with process level HW-backed TEE solution, and the images stored in the secure file system can be encrypted with a new generated key. The container accesses the data with the data path and decrypts the data with the data key, at 526.

If the same VM level does apply, at 524 YES branch, the ICS is protected with VM level HW-based TEE solution, there is no encryption need to store the unpacked images because the secure file system is already in a protected environment. In one example, the container accesses the unencrypted data with the data path, at 528.

Figure 6:
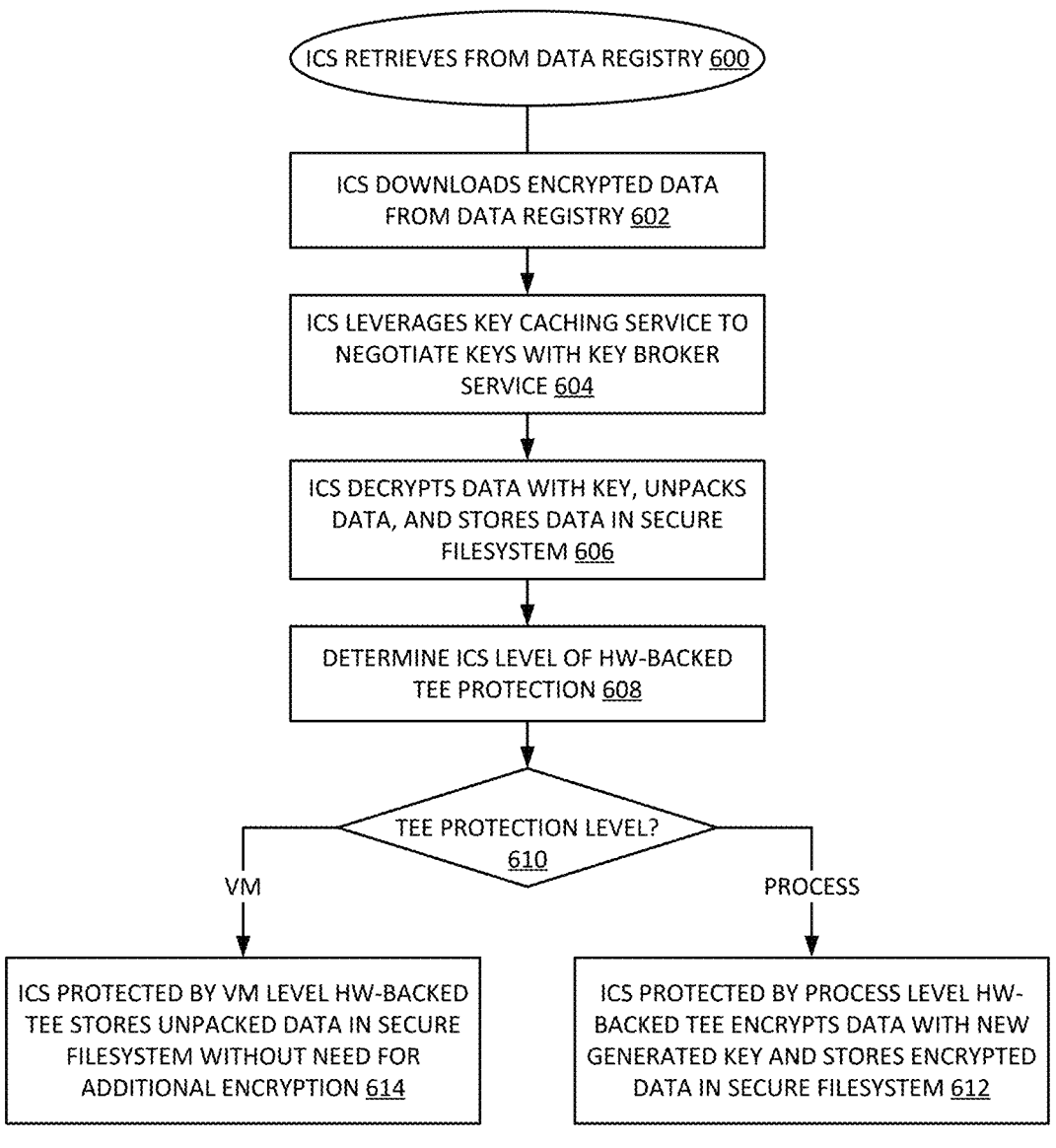
FIG. 6 is a flow diagram of an example of a process for retrieval of shared data from a data registry.

FIG. 6 is a flow diagram of an example of a process for retrieval of shared data from a data registry. Process 600 represents a process for the ICS to retrieve shared data from a data registry. Process 600 can be in accordance with block 516.

In one example, the ICS downloads encrypted data from the data registry, at 602. In one example, the ICS leverages a key caching service to negotiate keys with the key broker service, at 604. The ICS can decrypt the data with a key, unpack the data, and store the data in a secure filesystem, at 606.

In one example, the system determines the ICS level of the hardware-backed TEE protection, at 608. If the TEE protection level is the same virtual machine level, at 610 VM branch, the ICS protected by the VM level hardware backed TEE can store unpacked data in the secure filesystem without the need for additional encryption, at 614. If the TEE protection level is process level protection, at 610 PROCESS branch, the ICS protected by process level hardware back TEE encrypts data with a new generated key and stores the encrypted data in the secure filesystem, at 612.

Figure 7:
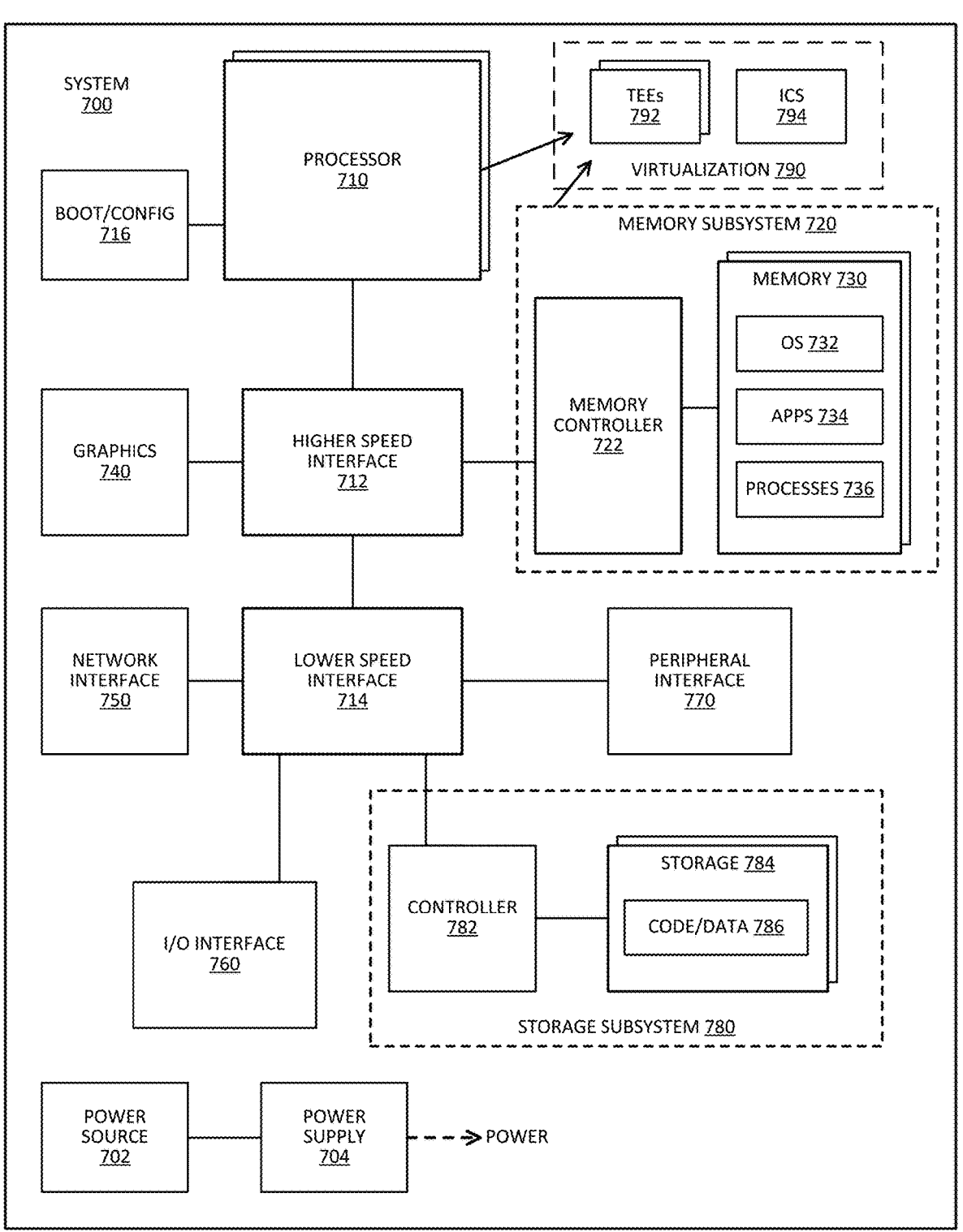
FIG. 7 is a block diagram of an example of a computing system in which secure data sharing within a pod can be implemented.

FIG. 7 is a block diagram of an example of a computing system in which secure data sharing within a pod can be implemented. System 700 represents a computing device in accordance with any example herein, and can be a laptop computer, a desktop computer, a tablet computer, a server, a rack-based computing device, a gaming or entertainment control system, embedded computing device, or other electronic device.

In one example, system 700 represents hardware components to implement virtualization 790. Virtualization 790 can be through a virtual machine or through a bare metal container. The virtualization can include multiple TEEs 792 or containers backed by hardware. Virtualization 790 can include ICS 794, which represents a caching process in accordance with any example herein.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700, and can be or include, one or more programmable general-purpose or special-purpose micro-processors, digital signal processors (DSPs), programmable controllers, application specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700 and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, NAND, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is non-volatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
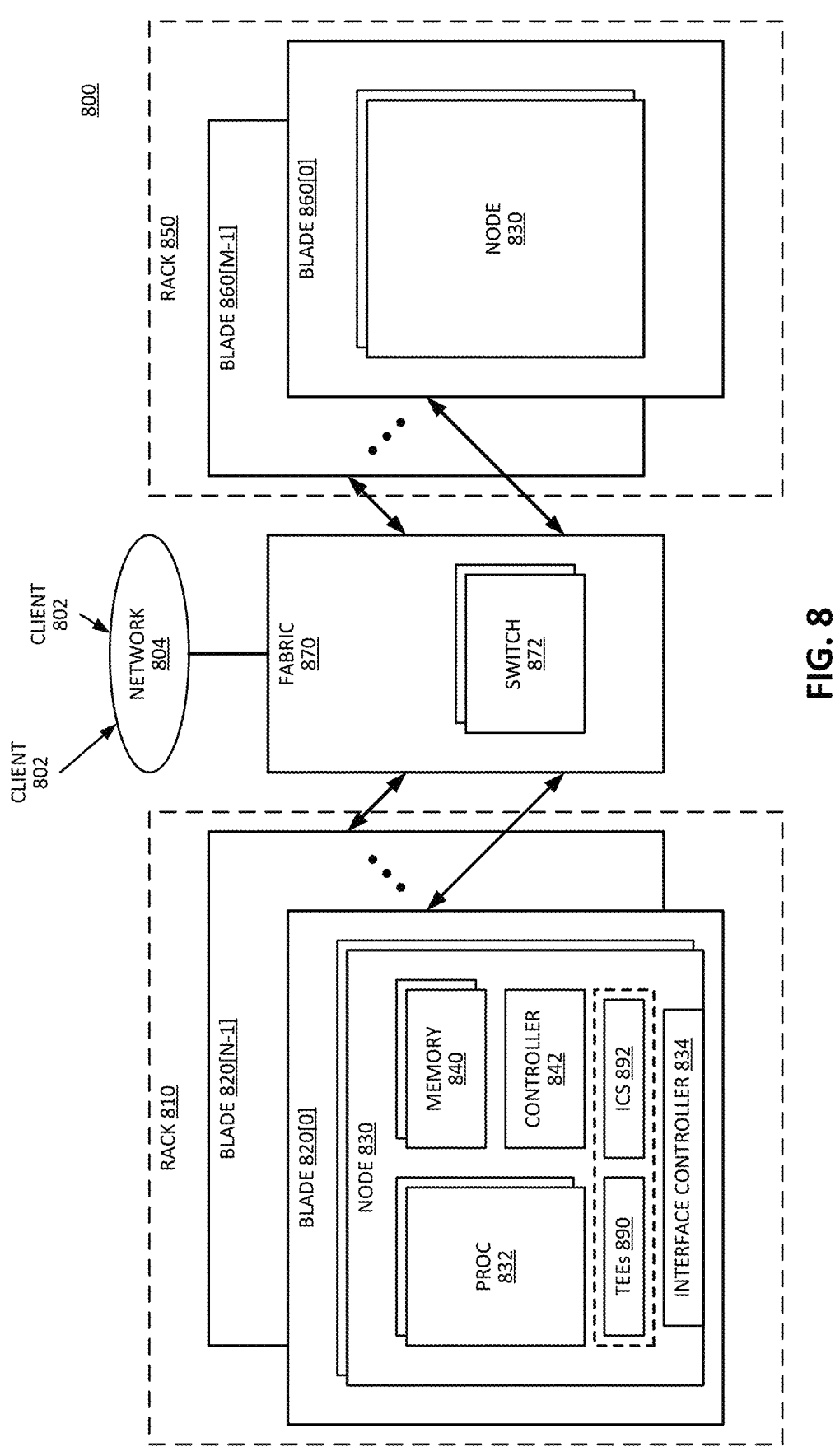
FIG. 8 is a block diagram of an example of a multi-node network in which secure data sharing within a pod can be implemented.

FIG. 8 is a block diagram of an example of a multi-node network in which secure data sharing within a pod can be implemented. System 800 represents a network of nodes. In one example, system 800 represents a data center. In one example, system 800 represents a server farm. In one example, system 800 represents a data cloud or a processing cloud.

Node 830 represents a computing device of blade 820[0] in system 800. In one example, node 830 represents hardware components to implement virtualization. Virtualization can be through a virtual machine or through a bare metal container. The virtualization can include multiple TEEs 890 or containers backed by hardware. Virtualization can include ICS 892, which represents a caching process in accordance with any example herein.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 840 can be or include memory devices represented by memory 840 and a memory controller represented by controller 842.

Figure 9:
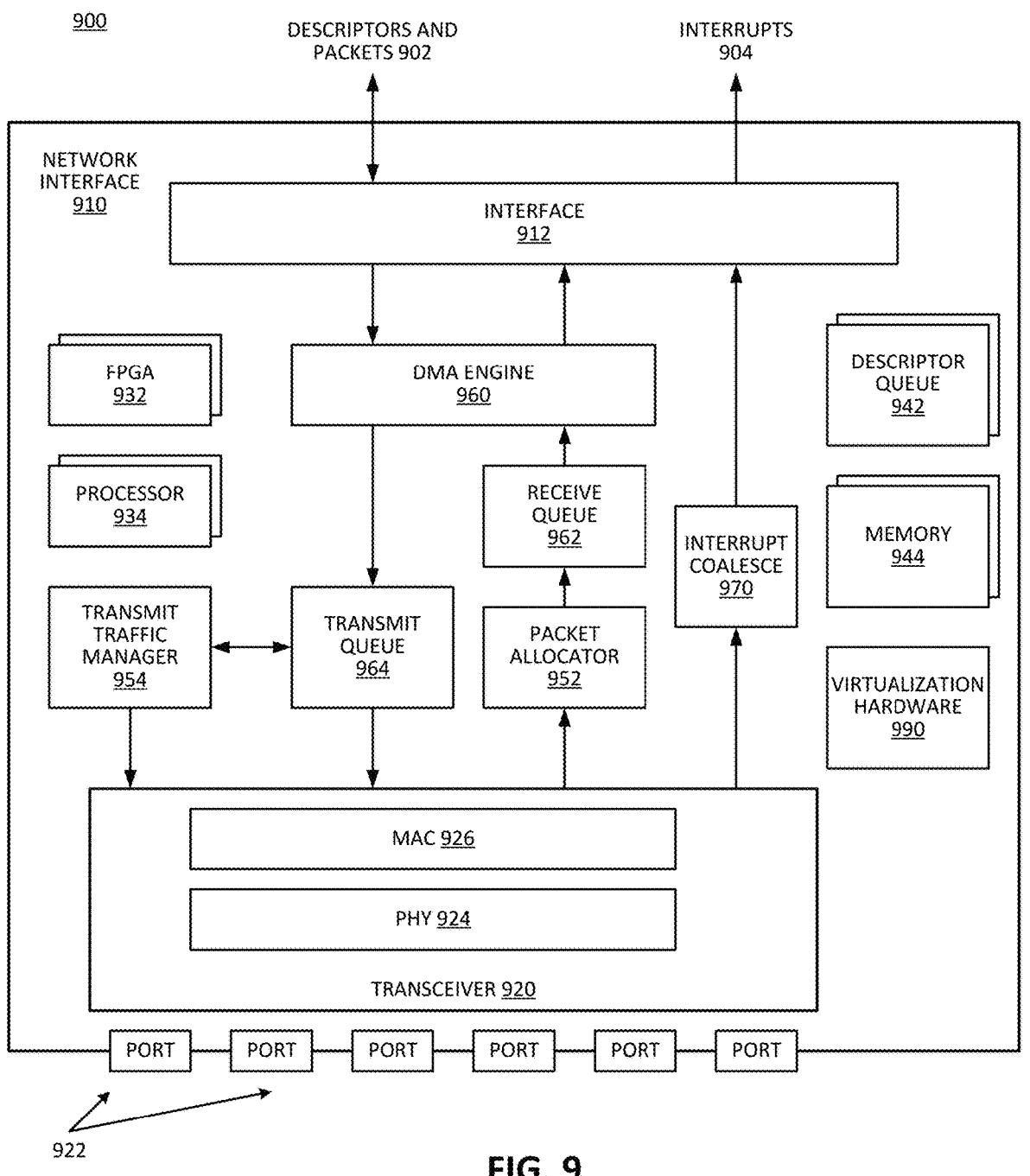
FIG. 9 is a block diagram of an example of a network interface device.

FIG. 9 is a block diagram of an example of a network interface device. Various hardware and software resources in the network interface can be configured to perform optical communication with an array of optical devices to interface with a connector having multiple waveguides, as described herein. System 900 includes network interface 910, which can be a standalone device or chip, or can be a circuit integrated into a processor or control substrate. In some examples, network interface 910 can be implemented as a network interface controller, network interface card, a host fabric interface (HFI), or host bus adapter (HBA), and such examples can be interchangeable. network interface 910 can be coupled to one or more servers using a bus, PCIe, CXL, or DDR. Network interface 910 can be embodied as part of a system-on-a-chip (SoC) that includes one or more processors, or included on a multichip package that also contains one or more processors.

Some examples of network interface 910 are part of an infrastructure processing unit (IPU) or data processing unit (DPU) or utilized by an IPU or DPU. An xPU can refer at least to an IPU, DPU, GPU, GPGPU (general purpose graphics processing unit), or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 910 can include transceiver 920, processors 934, transmit queue 964, receive queue 962, memory 944, bus interface 912, and DMA (direct memory access) engine 960. Transceiver 920 can be capable of receiving and transmitting packets in conformance with applicable protocols such as Ethernet as described in IEEE 802.3, although other protocols can be used. Transceiver 920 can receive and transmit packets from and to a network via a network medium (not depicted) via ports 922. Ports 922 can interface to connectors that transmit networks signals via the network medium. Transceiver 920 can include physical layer circuitry (PHY) 924 and media access control circuitry (MAC) 926. PHY 924 can include encoding and decoding circuitry (not shown) to encode and decode data packets according to applicable physical layer specifications or standards. MAC 926 can be configured to perform MAC address filtering on received packets, process MAC headers of received packets by verifying data integrity, remove preambles and padding, and provide packet content for processing by higher layers. MAC 926 can be configured to assemble data to be transmitted into packets.

Processors 934 can be any a combination of: a processor, processing core, graphics processing unit (GPU), field programmable gate array (FPGA) 932, application specific integrated circuit (ASIC), or other programmable hardware device that allows programming of network interface 910. For example, a "smart network interface" or SmartNIC can provide packet processing capabilities in the network interface using processors 934.

Processors 934 can include a programmable processing pipeline that is programmable by P4, C, Python, Broadcom Network Programming Language (NPL), NVIDIA® CUDA®, NVIDIA® DOCA™, or x86 compatible executable binaries or other executable binaries. A programmable processing pipeline can include one or more match-action units (MAUs) that can schedule packets for transmission. Processors, FPGAs, other specialized processors, controllers, devices, or other circuits, or a combination can be used utilized for packet processing or packet modification. Ternary content-addressable memory (TCAM) can be used for parallel match-action or look-up operations on packet header content.

Packet allocator 952 can provide distribution of received packets for processing by multiple CPUs or cores using receive side scaling (RSS). When packet allocator 952 uses RSS, packet allocator 952 can calculate a hash or make another determination based on contents of a received packet to determine which CPU or core is to process a packet.

Interrupt coalesce 970 can perform interrupt moderation whereby network interface interrupt coalesce 970 waits for multiple packets to arrive, or for a timeout to expire, before generating an interrupt to the host to process received packet(s). Interrupts 904 represent the interrupts provided to the host. Receive segment coalescing (RSC) can be performed by network interface 910 whereby portions of incoming packets are combined into segments of a packet. Network interface 910 provides this coalesced packet to an application.

DMA engine 960 can copy a packet header, packet payload, and/or descriptor directly from host memory to the network interface or vice versa, instead of copying the packet to an intermediate buffer at the host and then using another copy operation from the intermediate buffer to the destination buffer. Descriptors and packets 902 represent packets and descriptors to be provided to the host (e.g., host memory or host processor) for network receive operation, or packets and descriptors from the host to use for network transmit operation.

Memory 944 can be any type of volatile or nonvolatile memory device and can store any queue or instructions used to program network interface 910. Transmit queue 964 can include data or references to data for transmission by transceiver 920. Transmit traffic manager 954 can manage the transmission of packets from transmit queue 964 to transceiver 920. Receive queue 962 can include data or references to data that was received by transceiver 920 from a network. Descriptor queues 942 can include descriptors that reference data or packets in transmit queue 964 or receive queue 962. Bus interface 912 can provide an interface with the host (not depicted). For example, bus interface 912 can be compatible with or based at least in part on PCI, PCI Express, PCI-x, Serial ATA, and/or USB (although other interconnection standards may be used), or proprietary variations thereof.

In one example, network interface 910 includes virtualization hardware 990. Virtualization hardware 990 can provide hardware components to implement virtualization in a multitenant system. The virtualization can be through a virtual machine or through a bare metal container. The virtualization can include multiple TEEs or containers backed by hardware. Virtualization can include an ICS, which represents a caching process in accordance with any example herein.

Figure 10:
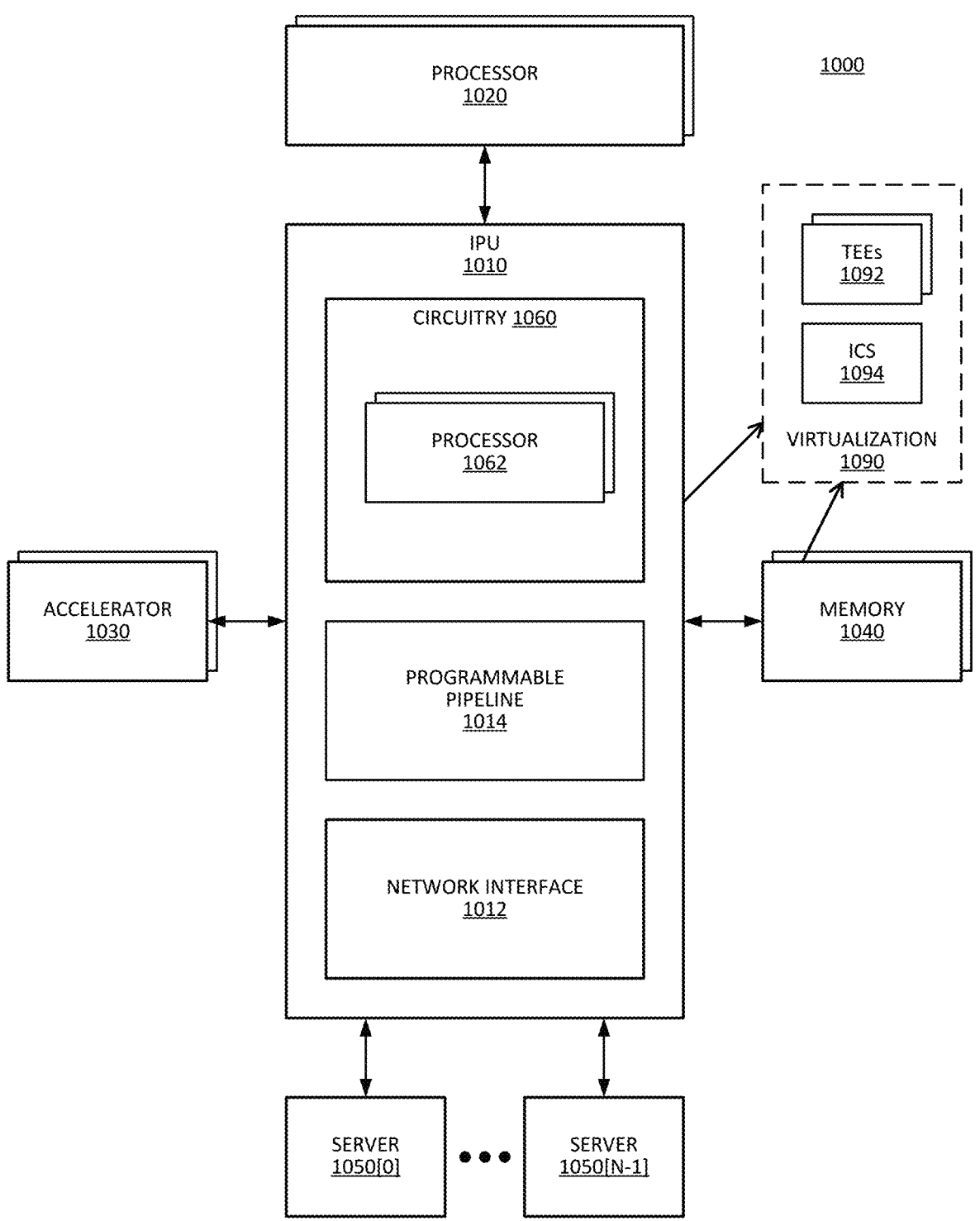
FIG. 10 is a block diagram of an example of a system with a network interface device.

FIG. 10 is a block diagram of an example of a system with a network interface device. System 1000 includes IPU (infrastructure processing unit) 1010 to provide processing and network interconnection. IPU 1010 includes circuitry 1060, which can include processors 1062 and one or more control circuits, such as circuits to control network interconnection operation.

In system 1000, IPU 1010 manages performance of one or more processes using one or more of processors 1062, processors 1020, accelerators 1030, memory 1040, or servers 1050[0:N-1], collectively, servers 1050, where N is an integer of 1 or more. Memory 1040 can represent a memory pool, having one or more memory devices that can be shared among one or more components of system 1000. In some examples, processor 1062 can execute one or more processes, applications, VMs (virtual machines), containers, microservices, and so forth, which request performance of workloads by one or more of: processors 1020, accelerators 1030, memory 1040, or servers 1050, or a combination of these.

IPU 1010 can utilize network interface 1012 or one or more device interfaces to communicate with processors 1020, accelerators 1030, memory 1040, and/or servers 1050. IPU 1010 can utilize programmable pipeline 1014 to process packets that are to be transmitted from network interface 1012 or packets received from network interface 1012.

In one example, system 1000 represents hardware components to implement virtualization 1090. Virtualization 1090 can be through a virtual machine or through a bare metal container. The virtualization can include multiple TEEs 1092 or containers backed by hardware. Virtualization 1090 can include ICS 1094, which represents a caching process in accordance with any example herein.

The following are examples in accordance with the descriptions herein.

Example 1 is a system including a storage device to store shared data specific to a tenant of a multitenant environment, the shared data to be shared by multiple hardware-protected confidential containers of a group of confidential containers for the tenant having a trusted execution environment (TEE), the group of confidential containers to share a runtime configuration; and a processor associated with a first container of the multiple confidential containers of the group to execute a caching service for the first container to manage access to the shared data for the group, the caching service to cache a copy of the shared data from the storage device to a cache, attest a key for the first container, to verify that the first container is part of the group for the tenant and part of the TEE, and access the shared data from the cache shared for the first container with the attested key.

Example 2 is a system in accordance with Example 1, wherein the storage device is to store the shared data in accordance with an encrypted filesystem.

Example 3 is a system in accordance with either Example 1 or Example 2, wherein the multiple confidential containers of the group have a common public key.

Example 4 is a system in accordance with Example 3, wherein each of the multiple confidential containers of the group has a unique private key.

Example 5 is a system in accordance with Example 4, wherein, to access the shared data, the first container is to provide its unique private key to the caching service, and receive a symmetric key from the caching service to decrypt the shared data.

Example 6 is a system in accordance with any of Example 1 to Example 5, wherein, when the first container is protected by a same virtual machine level of protection, the caching service is to cache the shared data unencrypted for the first container.

Example 7 is a system in accordance with any of Example 1 to Example 6, wherein, when the first container is protected by a different virtual machine level of protection, the caching service is to cache the shared data encrypted for the first container.

Example 8 is a system in accordance with any of Example 1 to Example 7, wherein the multiple confidential containers include a bare metal confidential container.

Example 9 is a system in accordance with any of Example 1 to Example 8, wherein the multiple confidential containers include a confidential virtual machine.

Example 10 is a system in accordance with any of Example 1 to Example 9, wherein the multiple confidential containers include an execution environment protected by TRUSTED EXECUTION TECHNOLOGY (TXT) available from INTEL CORPORATION.

Example 11 is a system in accordance with any of Example 1 to Example 9, wherein the multiple confidential containers include an execution environment protected by TRUST DOMAIN EXTENSION (TDX) available from INTEL CORPORATION.

Example 12 is a system in accordance with any of Example 1 to Example 9, wherein the multiple confidential containers include an execution environment protected by SOFTWARE GUARD EXTENSION (SGX) available from INTEL CORPORATION.

Example 13 is a system in accordance with any of Example 1 to Example 9, wherein the multiple confidential containers include an execution environment protected by TRUSTZONE available from ARM LIMITED.

Example 14 is a system in accordance with any of Example 1 to Example 9, wherein the multiple confidential containers include an execution environment protected by SECURE ENCRYPTED VIRTUALIZATION (SEV) available from ADVANCED MICRO DEVICES, INC.

Example 15 is a system in accordance with any of Example 1 to Example 14, wherein the multiple confidential containers include a combination of execution environments selected from Example 10 to Example 14.

Example 16 is a server system including: a storage device to store shared data specific to a tenant of a multitenant environment; and a server device to execute a first container of multiple confidential containers of a group of confidential containers for a tenant having a hardware-protected trusted execution environment (TEE), the group of confidential containers to share a runtime configuration, the server device to execute a caching service for the group to control access to the shared data for the group, the caching service to cache a copy of the shared data from the storage device to a cache, attest a key for the first container of the group of confidential containers, to verify that the first container is part of the group for the tenant, and access the shared data from the cache shared for the first container with the attested key.

Example 17 is a server system in accordance with Example 16, wherein the storage device is to store the shared data in accordance with an encrypted filesystem.

Example 18 is a server system in accordance with either Example 16 or Example 17, wherein the group of confidential containers have a common public key, and wherein each of the confidential containers has a unique private key.

Example 19 is a server system in accordance with Example 18, wherein, to access the shared data, the first container is to provide its unique private key to the caching service, and receive a symmetric key from the caching service to decrypt the shared data.

Example 20 is a server system in accordance with any of Example 16 to Example 19, wherein, when the first container is protected by a same virtual machine level of protection, the caching service is to cache the shared data unencrypted for the first container; and when the first container is protected by a different virtual machine level of protection, the caching service is to cache the shared data encrypted for the first container.

Example 21 is a server system in accordance with any of Example 16 to Example 19, wherein, when the first container is protected by a same virtual machine level of protection, the caching service is to cache the shared data unencrypted for the first container.

Example 22 is a server system in accordance with any of Example 16 to Example 19, wherein, when the first container is protected by a different virtual machine level of protection, the caching service is to cache the shared data encrypted for the first container.

Example 23 is a server system in accordance with any of Example 16 to Example 22, wherein the multiple confidential containers include a bare metal confidential container.

Example 24 is a server system in accordance with any of Example 16 to Example 23, wherein the multiple confidential containers include a confidential virtual machine.

Example 25 is a server system in accordance with any of Example 16 to Example 24, wherein the multiple confidential containers include an execution environment protected by TRUSTED EXECUTION TECHNOLOGY (TXT) available from INTEL CORPORATION, an execution environment protected by TRUST DOMAIN EXTENSION (TDX) available from INTEL CORPORATION, an execution environment protected by SOFTWARE GUARD EXTENSION (SGX) available from INTEL CORPORATION, an execution environment protected by TRUSTZONE available from ARM LIMITED, or an execution environment protected by SECURE ENCRYPTED VIRTUALIZATION (SEV) available from ADVANCED MICRO DEVICES, INC., or a combination of execution environments selected from these.

Example 26 is a method for sharing data including: caching a copy of shared data from a storage device to a cache, the shared data specific to a tenant of a multitenant environment; receiving a request for the shared data from a first container of multiple confidential containers of a hardware-protected trusted execution environment (TEE) of a group of confidential containers of the tenant; attesting a key for the first container; verifying that the first container is part of the TEE of the group for the tenant; and accessing the shared data from the cache shared for the first container with the attested key.

Example 27 is a method in accordance with Example 26, wherein the storage device stores the shared data in accordance with an encrypted filesystem.

Example 28 is a method in accordance with either Example 26 or Example 27, wherein the multiple confidential containers of the group have a common public key.

Example 29 is a method in accordance with Example 28, wherein each of the multiple confidential containers of the group has a unique private key.

Example 30 is a method in accordance with Example 29, wherein attesting the key for the first container comprises receiving the unique private key for the first container, and wherein providing a symmetric key to the first container to decrypt the shared data.

Example 31 is a method in accordance with any of Example 26 to Example 30, wherein accessing the shared data from the storage device comprises caching the shared data unencrypted for the first container when the first container is protected by a same virtual machine level of protection as a caching service that attests the key.

Example 32 is a method in accordance with any of Example 26 to Example 31, wherein accessing the shared data from the storage device comprises caching the shared data encrypted for the first container when the first container is protected by a different virtual machine level of protection as a caching service that attests the key.

Example 33 is a method in accordance with any of Example 26 to Example 33, wherein the multiple confidential containers include a bare metal confidential container.

Example 34 is a method in accordance with any of Example 26 to Example 33, wherein the multiple confidential containers include a confidential virtual machine.

Example 35 is a method in accordance with any of Example 26 to Example 34, wherein the multiple confidential containers include an execution environment protected by TRUSTED EXECUTION TECHNOLOGY (TXT) available from INTEL CORPORATION, an execution environment protected by TRUST DOMAIN EXTENSION (TDX) available from INTEL CORPORATION, an execution environment protected by SOFTWARE GUARD EXTENSION (SGX) available from INTEL CORPORATION, an execution environment protected by TRUSTZONE available from ARM LIMITED, or an execution environment protected by SECURE ENCRYPTED VIRTUALIZATION (SEV) available from ADVANCED MICRO DEVICES, INC., or a combination of execution environments selected from these.

Example 36 is a computer readable storage medium having content, which when executed causes a machine to perform a method for sharing data including: caching a copy of shared data from a storage device to a cache, the shared data specific to a tenant of a multitenant environment; receiving a request for the shared data from a first container of multiple confidential containers of a hardware-protected trusted execution environment (TEE) of a group of confidential containers of the tenant; attesting a key for the first container; verifying that the first container is part of the TEE of the group for the tenant; and accessing the shared data from the cache shared for the first container with the attested key.

Example 37 is a computer readable storage medium in accordance with Example 36, wherein the storage device stores the shared data in accordance with an encrypted filesystem.

Example 38 is a computer readable storage medium in accordance with either Example 36 or Example 37, wherein the multiple confidential containers of the group have a common public key.

Example 39 is a computer readable storage medium in accordance with Example 38, wherein each of the multiple confidential containers of the group has a unique private key.

Example 40 is a computer readable storage medium in accordance with Example 39, wherein attesting the key for the first container comprises receiving the unique private key for the first container, and wherein providing a symmetric key to the first container to decrypt the shared data.

Example 41 is a computer readable storage medium in accordance with any of Example 36 to Example 40, wherein accessing the shared data from the storage device comprises caching the shared data unencrypted for the first container when the first container is protected by a same virtual machine level of protection as a caching service that attests the key.

Example 42 is a computer readable storage medium in accordance with any of Example 36 to Example 41, wherein accessing the shared data from the storage device comprises caching the shared data encrypted for the first container when the first container is protected by a different virtual machine level of protection as a caching service that attests the key.

Example 43 is a computer readable storage medium in accordance with any of Example 36 to Example 42, wherein the multiple confidential containers include a bare metal confidential container.

Example 44 is a computer readable storage medium in accordance with any of Example 36 to Example 43, wherein the multiple confidential containers include a confidential virtual machine.

Example 45 is a computer readable storage medium in accordance with any of Example 36 to Example 44, wherein the multiple confidential containers include an execution environment protected by TRUSTED EXECUTION TECHNOLOGY (TXT) available from INTEL CORPORATION, an execution environment protected by TRUST DOMAIN EXTENSION (TDX) available from INTEL CORPORATION, an execution environment protected by SOFTWARE GUARD EXTENSION (SGX) available from INTEL CORPORATION, an execution environment protected by TRUSTZONE available from ARM LIMITED, or an execution environment protected by SECURE ENCRYPTED VIRTUALIZATION (SEV) available from ADVANCED MICRO DEVICES, INC., or a combination of execution environments selected from these.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable"

form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A system, comprising:
a storage device to store shared data specific to a tenant of a multitenant environment, the shared data to be shared by multiple hardware-protected confidential containers of a group of confidential containers for the tenant having a trusted execution environment (TEE), the group of confidential containers to share a runtime configuration; and
a processor associated with a first container of the multiple confidential containers of the group to execute a caching service for the first container to manage access to the shared data for the group, the caching service to cache a copy of the shared data from the storage device to a shared cache accessible by a second container of the multiple confidential containers of the group, attest a key for the second container to verify that the second container is part of the group for the tenant and part of the TEE, and access the shared data with the attested key from the shared cached to enable the second container to execute on the shared data without the second container needing to cache the shared data.

2. The system of claim 1, wherein the storage device is to store the shared data in accordance with an encrypted filesystem.

3. The system of claim 1, wherein the multiple confidential containers of the group have a common public key.

4. The system of claim 3, wherein each of the multiple confidential containers of the group has a unique private key.

5. The system of claim 4, wherein, to access the shared data, the first container is to provide its unique private key to the caching service, and receive a symmetric key from the caching service to decrypt the shared data.

6. The system of claim 1, wherein, when the first container is protected by a same virtual machine level of protection, the caching service is to cache the shared data unencrypted for the first container.

7. The system of claim 1, wherein, when the first container is protected by a different virtual machine level of protection, the caching service is to cache the shared data encrypted for the first container.

8. The system of claim 1, wherein the multiple confidential containers include a bare metal confidential container.

9. The system of claim 1, wherein the multiple confidential containers include a confidential virtual machine.

10. The system of claim 1, wherein the multiple confidential containers include an execution environment protected by TRUSTED EXECUTION TECHNOLOGY (TXT) available from INTEL CORPORATION, an execution environment protected by TRUST DOMAIN EXTENSION (TDX) available from INTEL CORPORATION, an execution environment protected by SOFTWARE GUARD EXTENSION (SGX) available from INTEL CORPORATION, an execution environment protected by TRUST-ZONE available from ARM LIMITED, or an execution environment protected by SECURE ENCRYPTED VIRTU-ALIZATION (SEV) available from ADVANCED MICRO DEVICES, INC.

11. A method for sharing data, comprising:
caching a copy of shared data from a storage device to a shared cache with a first container of multiple confidential containers of a hardware-protected trusted execution environment (TEE) of a group of confidential containers of a tenant, the shared data specific to the tenant of a multitenant environment;
receiving a request for the shared data from a second container of the multiple confidential containers;
attesting a key for the second container;
verifying that the second container is part of the TEE of the group for the tenant; and
accessing the shared data with the attested key from the shared cached to enable the second container to execute on the shared data without the second container needing to cache the shared data.

12. The method of claim 11, wherein the multiple confidential containers of the group have a common public key.

13. The method of claim 12, wherein each of the multiple confidential containers of the group has a unique private key.

14. The method of claim 13, wherein attesting the key for the first container comprises receiving the unique private key for the first container, and wherein providing a symmetric key to the first container to decrypt the shared data.

15. The method of claim 11, wherein accessing the shared data from the storage device comprises caching the shared data unencrypted for the first container when the first container is protected by a same virtual machine level of protection as a caching service that attests the key.

16. The method of claim 11, wherein accessing the shared data from the storage device comprises caching the shared data encrypted for the first container when the first container is protected by a different virtual machine level of protection as a caching service that attests the key.

17. A non-transitory computer readable storage medium having content stored thereon, which when executed causes a machine to perform a method for sharing data including: caching a copy of shared data from a storage device to a shared cache with a first container of multiple confidential containers of a hardware-protected trusted execution environment (TEE) of a group of confidential containers of a tenant, the shared data specific to the tenant of a multitenant environment; receiving a request for the shared data from a second container of the multiple confidential containers; attesting a key for the second container; verifying that the second container is part of the TEE of the group for the tenant; and accessing the shared data with the attested key from the shared cached to enable the second container to execute on the shared data without the second container needing to cache the shared data.

18. The non-transitory computer readable storage medium of claim 17, wherein the multiple confidential containers of the group have a common public key and each of the multiple confidential containers of the group has a unique private key.

19. The non-transitory computer readable storage medium of claim 18, wherein attesting the key for the first container comprises receiving the unique private key for the first container, and wherein providing a symmetric key to the first container to decrypt the shared data.

20. The non-transitory computer readable storage medium of claim 17, wherein accessing the shared data from the storage device comprises caching the shared data unencrypted for the first container when the first container is protected by a same virtual machine level of protection as a caching service that attests the key.

21. The non-transitory computer readable storage medium of claim 17, wherein accessing the shared data from the storage device comprises caching the shared data encrypted for the first container when the first container is protected by a different virtual machine level of protection as a caching service that attests the key.

\* \* \* \* \*